US007693586B2

(12) United States Patent
Dumas et al.

(10) Patent No.: US 7,693,586 B2
(45) Date of Patent: Apr. 6, 2010

(54) PROCESS MODEL TRANSFORMATION FOR EVENT-BASED COORDINATION OF COMPOSITE APPLICATIONS

(75) Inventors: Marlon G. Dumas, Queensland (AU); Julien J. P. Vayssiere, Queensland (AU); Tore Fjellheim, Queensland (AU)

(73) Assignee: SAP AG, Walldorf (DE)

( * ) Notice: Subject to any disclaimer, the term of this patent is extended or adjusted under 35 U.S.C. 154(b) by 1037 days.

(21) Appl. No.: 11/219,526

(22) Filed: Sep. 2, 2005

(65) Prior Publication Data

US 2007/0150075 A1    Jun. 28, 2007

(51) Int. Cl.
*G05B 13/02* (2006.01)
(52) U.S. Cl. .......................................... 700/32
(58) Field of Classification Search .................. 700/29, 700/31, 32, 33
See application file for complete search history.

(56) References Cited

U.S. PATENT DOCUMENTS

| | | | |
|---|---|---|---|
| 5,218,676 A | | 6/1993 | Ben-Ayed et al. |
| 6,023,702 A | * | 2/2000 | Leisten et al. ............... 707/100 |
| 6,041,306 A | * | 3/2000 | Du et al. ........................ 705/8 |
| 6,065,009 A | * | 5/2000 | Leymann et al. ............... 707/10 |
| 6,826,579 B1 | | 11/2004 | Leymann et al. |
| 6,901,425 B1 | * | 5/2005 | Dykes et al. ................. 709/203 |
| 7,139,999 B2 | | 11/2006 | Bowman-Amuah |
| 7,200,563 B1 | | 4/2007 | Hammitt et al. |
| 7,272,816 B2 | * | 9/2007 | Schulz et al. ................. 717/104 |
| 2001/0055380 A1 | | 12/2001 | Benedyk et al. |
| 2002/0034186 A1 | | 3/2002 | Huang |
| 2002/0040312 A1 | | 4/2002 | Dhar et al. |
| 2002/0095493 A1 | | 7/2002 | Byrnes |
| 2003/0058813 A1 | | 3/2003 | Viola et al. |
| 2003/0095523 A1 | | 5/2003 | Korus et al. |
| 2003/0233374 A1 | | 12/2003 | Spinola et al. |
| 2003/0233479 A1 | | 12/2003 | Keohane et al. |
| 2004/0162741 A1 | | 8/2004 | Flaxer et al. |
| 2004/0252694 A1 | | 12/2004 | Adhikari et al. |
| 2006/0143620 A1 | | 6/2006 | Elms et al. |
| 2007/0135936 A1 | | 6/2007 | Dumas et al. |

FOREIGN PATENT DOCUMENTS

WO     2005119965 A1    12/2005

OTHER PUBLICATIONS

W.M.P. van der Aaist; ?Making Work Flow: On the Application of Petri Nets to Business Process Managemtn; Department of Technology Mnagement; Eindhoven Univesity of Technology; 2002; pp. 1-22.*

(Continued)

*Primary Examiner*—Albert DeCady
*Assistant Examiner*—Chad Rapp
(74) *Attorney, Agent, or Firm*—Brake Hughes Bellermann LLP

(57) ABSTRACT

A process model specified using, for example, UML activity diagrams can be translated into an event-based model that can be executed on top of a coordination middleware. For example, a process model may be encoded as a collection of coordinating objects that interact with each other through a coordination middleware including a shared memory space. This approach is suitable for undertaking post-deployment adaptation of process-oriented composite applications. In particular, new control dependencies can be encoded by dropping new (or enabling existing) coordinating objects into the space and/or disabling existing ones.

18 Claims, 14 Drawing Sheets

OTHER PUBLICATIONS

*European Search report for Application* No. 06017086.7, (Aug. 11, 2006),1-8.

Fjellheim, T , "The 3DMA middleware for mobile application", *Lecture Notes in Computer Science, springer verlag* vol. 3207, (Aug. 2004),312-323.

Geppert, D , "Event -based Distributed Workflow Execution with EVE", URL:http://citeseer.nj.nec.com/33730.html (Mar. 1, 1996),1-15.

Benatallah, Boualem , "Facilitating the Rapid Developments and Scalable Orchestration of Composite Web Services", *Distributed and Parallel Databases*, 17, 2005 Springer Science + Business Media, Inc., Manufactured in The Netherlands,(2005), 5-37.

Casati, Fabio , "Specification and Implementation of Exceptions in Workflow Management Systems", *ACM Transactions on Database Systems*, vol. 24, No. 3, (Sep. 1999),405-451.

Hwang, San-Yih, "Personal Workflows: Modeling and Management", *MDM 2003, LNCS 2575*, Springer-Verlag Berlin Heidelberg 2003,(2003),141-152.

Sheng, Quan Z., "Enabling Personalized Composition and Adaptive Provisioning of Web Services", *CAiSE 2004, LNCS 3084*. Springer-Verlag Berlin Heidelberg 2004,(2004),322-337.

Tolksdorf, Robert , "Coordination Technology for Workflows on the Web: Workspace", *Coordination 2000, LNCS 1906*, Springer-Verlag Berlin Heidelberg 2000,(2000),36-50.

"JavaSpaces TM specification", XP002957732, (1998),1-30.

European Search Report 06 017 088.3, (Oct. 5, 2006).

U.S. Appl. No. 11/218,933 Office Action dated Jun. 4, 2007.

W. M.P. van der Aalst. "How to handle dynamic change and capture management information: An approach based on generic workflow models". Computer Systems Science and Engineering, 15(5):295-318, (2001).

W.M.P. van der Aalst, et al. "YAWL: Yet Another Workflow Language". Information Systems, 30(4):245-275, (2004).

W.M.P. van der Aalst, et al. "Case handling: A new paradigm for business process support". Data and Knowledge Engineering, 53(2):129-162, (2005).

G. Cabri, et al. "Reactive tuple spaces for mobile agent coordination". In Proceedings of the Second International Workshop on Mobile Agents, pp. 237-248, Stuttgart, Germany, (1999).

C-L. Fok, et al., "A lightweight coordination middleware for mobile computing". In Proceedings of the 6th International Conference on Coordination Models and Languages, pp. 135-151, Pisa, Italy, (Feb. 2004).

D. Gelernter. "Generative communication in Linda". ACM Transactions on Programming, 2(1):80-112, (Jan. 1985).

R. Muller, et al. "AgentWork: a workflow system supporting rule-based workflow adaptation". Data and Knowledge Engineering, 51(2):223-256, (Nov. 2004).

S. Rinderle, et al. "Correctness criteria for dynamic changes in workflow systems—a survey". Data and Knowledge Engineering, 50(1):9-34, (2004).

P. Wohed, et al. "Pattern-based Analysis of the Control-flow Perspective of UML Activity Diagrams". In Proceedings of the International Conference on Conceptual Modelling (ER), Klagenfurt, Austria, (Oct. 2004).

Aalst, W.M.P. V., "Making Work Flow: On the Application of Petri Nets to Business Process Mangement", LNCS 2360, Department of Technology Management, Eindhoven Unviersity of Technology, (2002) 1-22.

Denti, Enrico et al., "LuCe: A Tuple-based Coordination Infrastructure for Prolog and Java Agents", Autonomous Agents and Multi-Agent Systems, 4, Kluwer Academic Publishers, (2001), 138-141.

Result of Consultation for EP Application No. 06017088.3 dated Apr. 16, 2008.

Related U.S. Appl. No. 11/218,933 Office Action dated Jun. 4, 2007.

Related U.S. Appl. No. 11/218,933 Office Action dated Nov. 15, 2007.

Related U.S. Appl. No. 11/218,933 Office Action dated Mar. 5, 2008.

Related U.S. Appl. No. 11/218,933 Office Action dated Jun. 27, 2008.

Aalst, W.M.P. V., et al., "Workflow Patterns", Distributed and Parallel Databases, 14, 5-51, 2003,Kluwer Academic Publishers. Manufactured in The Netherlands., (2003),70 Pages.

Alonso, G. C., et al., "Web services", Concepts, architectures and applications. Springer Verlag, (2003), 27 pages.

Chaterjee, S. et al., "Messaging Patterns in Service-Oriented Architecture, Parts 1&2", Microsoft Architects Journal, Issues 2 and 3, Apr. and Jul. 2004, (Apr. and Jul. 2004),26 pages.

Fielding, R. T., "Architectural Styles and the Design of Network-based Software Architectures", PhD thesis, University of California, Irvine, 2000, (2000),180 pages.

Hagen, Claus et al., "Exception Handling in Workflow Management Systems", IEEE Transactions on Software Engineering 26(10): 943-958., (Oct. 2000),pp. 943-958.

Hohpe, G et al., "Enterprise integration patterns", Enterprise integration patterns: Designing, building, and deploying messaging solutions. Addison-Wesley (2002).

Kilgore, R et al., "Testing Distributed Programs Containing Racing Messages", The Computer Journal vol. 40, No. (8):(1997),pp. 489-498.

Kumar, A. et al., "Workflow support for electronic commerce applications", Decision Support Systems 32: pp. 265-278., (Jan. 2002),pp. 265-278.

"Non-Final Office Action received in U.S. Appl. No. 11/218,933 mailed on Jun. 4, 2007", 14 Pages.

"Final Office Action Received in U.S. Appl. No. 11/218,933 mailed on Nov. 15, 2007", 20 Pages.

"Non-Final Office Action in U.S. Appl. No. 11/218,933 mailed on Nov. 25, 2008", 20 Pages.

"European Search Report Received for EP Application No. 06017088.3 mailed on Oct. 5, 2006".

"Advisory Action Received for U.S. Appl. No. 11/218,933 mailed on Mar. 5, 2008", 4 Pages.

"Restriction and Election Requirement Action Received of U.S. Appl. No. 11/218,933 mailed on Jun. 27, 2008", 8 Pages.

"Non-Final Office Action received in U.S. Appl. No. 11/292,655 mailed on Oct. 3, 2008", 10 pages.

"Final Office Action received in U.S. Appl. No. 11/292,655 mailed on Mar. 23, 2009", 12 pages.

\* cited by examiner

```
<Coordinator name = `with participants''>
  <Input>
    <Template>
      <CompletionObject
action=''CheckTraffic'' piid=''1''/>
    </Template>
    <Condition>
      <Equality variable=''traffic''
value=''OK''/>
    </Condition>
  </Input>
  <Output>
     <EnablingObject action=''CatchTaxi''
piid=''1''/>
  </Output>
  <StopSet>
    <CompletionObject
action=''PostponeMeeting'' piid=''1''/>
  </StopSet>
</Coordinator>
```

FIG. 8

1202 {
AllInputSets(p: Process) :
    let {x1, ..., xn} = ActionNodes(p) in
    InputSets(x1) $U$ ...$U$ InputSets(xn)

1204 {
InputSets(x : Node) :
    let {t1, ... tn} = IncomingTrans(x) in
        return InputSetTrans(t1) $U$ ...$U$ InputSetTrans(tn)

1206 {
InputSetsTrans(t : Transition) :
    let x = Source(t)
        if NodeType(x) = "action"    ← 1208
            return CompletionObject(x)    ← 1210
        else if NodeType(x) = "initial"
            return ProcessInstantiationObject(Process(x))
        else if NodeType(x) in {"decision", "fork"}    ← 1212
            let {c1, ... , cn} = Disjuncts(Guard(t)),
                {i1, ... , in} = InputSets(Source(t)) in
                return {{c1} $U$ i1, ... , {c1} $U$ in},
                    ...
                    {cn} $U$ i1, ... , {cn} $U$ in}
        else if NodeType(x) = "merge"
            let {t1, ... , tn} = IncomingTrans(x) in
                return InputSetsTrans(t1) $U$ ...$U$ InputSetsTrans(tn)
        else if NodeType(x) = "join"
            let {t1, ... , tn} = IncomingTrans(x),
                {( i1,1, ... , i1,n),
                    ...
                ( im,1, ... , im,n)} = InputSetsTrans(t1) $\times$ ...$\times$ InputSetsTrans(tn) in
                return {i1,1 $U$ ... $U$ i1,n,
                    ...
                    im,1 $U$ ... $U$ im,n}

<Router name = ``CheckTrafficEnabler''>
          <Input>
       ⎛    <Template>
       ⎪    <CompletionObject
  1304 ⎨ actionName=''CheckPresentationTime''
       ⎪ piid=''var:X''/>
       ⎝    </Template>
       ⎧    <Template>
       ⎪    <CompletionObject
  1306 ⎨ actionName=''CheckTrainAvailability''       1302
       ⎪ piid=''var:X''/>
       ⎩    </Template>
       ⎧    <Condition>
  1308 ⎨      <Equality variable=''ontime'' value=''false''/>
       ⎩    </Condition>
       ⎧    <Condition>
  1310 ⎨      <Equality variable=''train'' value=''true''/>
       ⎩    </Condition>
          </Input>
          <Output>
          <EnablingObject action=''CheckTraffic''
        piid=''var:X''/>                              1312
          </Output>
        </Router>
```

PROCESS MODEL TRANSFORMATION FOR EVENT-BASED COORDINATION OF COMPOSITE APPLICATIONS

TECHNICAL FIELD

This description relates to coordination between software applications.

BACKGROUND

Process modeling refers generally to the formalization of a method(s) that defines tasks, as well as rules for controlling whether, when, and how the tasks are implemented. For example, a business process such as receipt of inventory at a warehouse may be formalized, or modeled, to define tasks related to how products are received, how corresponding information regarding the products is stored in a database, and how the products are distributed for storage within the warehouse. Virtually any process, business or otherwise, may be modeled in this way. The tasks of such process models may be implemented by human and/or computer (e.g., software applications) actors, and process execution engines may be used to implement particular instances of the process models and ensure that the modeled tasks are performed correctly, and in the correct order, and that instance-related data is managed appropriately within each process model instance.

An example of an area in which such process models are implemented includes the coordination and/or packaging of multiple software applications (and/or individual functionalities of the software applications) to obtain a desired result. Such Packaged Composite Applications (PCAs) allow developers to build new applications by using existing features of multiple, existing applications. For example, a developer may use customer objects and related functionality from a Customer Relationship Management System, and product information from a Product Management System, in order to provide customers with certain product information that may not otherwise be available.

In other words, such a process-oriented composite application may be used to aggregate functionality from a number of other applications, and to coordinate such applications according to a process model, e.g., a business process model. In this way, a composite functionality may be provided to a user, in a predictable, efficient, and useful manner.

SUMMARY

According to one general aspect, a selected task from among a plurality of tasks of a process model is determined. A first event-based application is associated with the selected task, and at least one input set associated with activating the first event-based application is determined, the input set associated with at least one event generated either when an instance of the process model is created and/or in response to completion of at least one preceding task of the selected task within the process model.

Implementations may include one or more of the following features. For example, a second event-based application may be defined as operable to receive the at least one event and evaluate the input set in order to determine whether to output a task-enabling event for enabling the first event-based application.

In this case, the first event-based application and the second event-based application may be deployed into a middleware in which the at least one event and the task-enabling event are written and/or read by the first event-based application and/or the second event-based application. Additionally, or alternatively, at least one object template associated with the completion of the at least one proceeding task and matching the input set may be determined, and conditions associated with the at least one object template for evaluation by the second event-based application may be defined as part of evaluating the input set.

Determining at least one input set for activating the first event-based application may include determining a transition of the process model, of which the selected task is a destination, and determining a node type associated with a source of the transition. In this case, determining a node type associated with a source of the transition may include determining that the source of the transition includes an initial node of the process model, and defining the input set to include a process instantiation event. Determining a node type associated with a source of the transition also may include determining that the source of the transition includes a task node of the process model, and defining the input set to include a completion event associated with a completion of the task node. Determining a node type associated with a source of the transition also may include determining that the source of the transition includes a control node of the process model, and traversing the process model backwards to reach at least one preceding task node. In this case, the input set may be defined as one of an appropriate number of input sets that together represent possible paths through the process model from the at least one preceding task node to the selected task.

Associating a first event-based application with the selected task may include determining an external application with which the first event-based application communicates in order to perform the selected task. An event-based representation of the process model may be generated, based on the input set and/or the at least one event.

According to another general aspect, a system includes a task extractor that is operable to extract tasks from a process model, a task analyzer that is operable to analyze the tasks to determine event-based rules for enacting the process model within an event-based execution environment, and an object generator that is operable to generate objects for deployment into the execution environment that are operable to coordinate an event-based instance of the process model, based on the event-based rules.

Implementations may include one or more of the following features. For example, the task analyzer may be operable to define, for each extracted task, the event-based rules to include at least one input set that specifies at least one path to each of the extracted tasks from a respective preceding task of the process model. The object generator may be operable to generate the objects including connector objects associated with the extracted tasks that are operable to coordinate with at least one external application for performance of the extracted tasks, and router objects encoded to read the input sets from a shared memory space and write task-enabling objects to the share memory space, based on the input sets.

The task analyzer may be operable to analyze at least one transition to a selected task of the extracted tasks and from a preceding task that is at least indirectly a source node of the selected task within the process model, and determine the event-based rules based on the transition and the source node. The source node may include one or more of an initial node of the process model, a task node of the process model, or a control node of the process model. The task analyzer may be operable to determine the event-based rules at least in part by traversing the process model backwards from the selected task, through the control node, and one or more source nodes of the selected task.

According to another general aspect, an apparatus includes a storage medium having instructions stored thereon. The instructions include a first code segment for extracting tasks from a process model, a second code segment for analyzing the tasks to determine rules for activating the tasks according to the process model, and a third code segment for generating coordinating objects for coordinating execution of an instance of the process model according to event objects that are generated by the coordinating objects according to the rules.

Implementations may include one or more of the following features. For example, the second code segment may include a fourth code segment for analyzing the rules to generate at least one input set that specifies at least one path to a selected one of the extracted tasks from a preceding task of the process model. The second code segment may include a fourth code segment for analyzing a transition to a selected one of the extracted tasks to determine the rules, based on whether a source of the transition includes, at least indirectly, one or more of an initial node, a preceding task node, or a control node of the process model.

The details of one or more implementations are set forth in the accompanying drawings and the description below. Other features will be apparent from the description and drawings, and from the claims.

BRIEF DESCRIPTION OF THE DRAWINGS

FIG. 8 is an example of a code section that may be implemented by the system of FIG. 1.

FIG. 12 is an example of a code section that may be used to implement the operations of the flowchart of FIG. 11.

FIG. 13 is an example of a code section that may be a result of the operations of the flowcharts of FIGS. 9-12.

DETAILED DESCRIPTION

Figure 1:
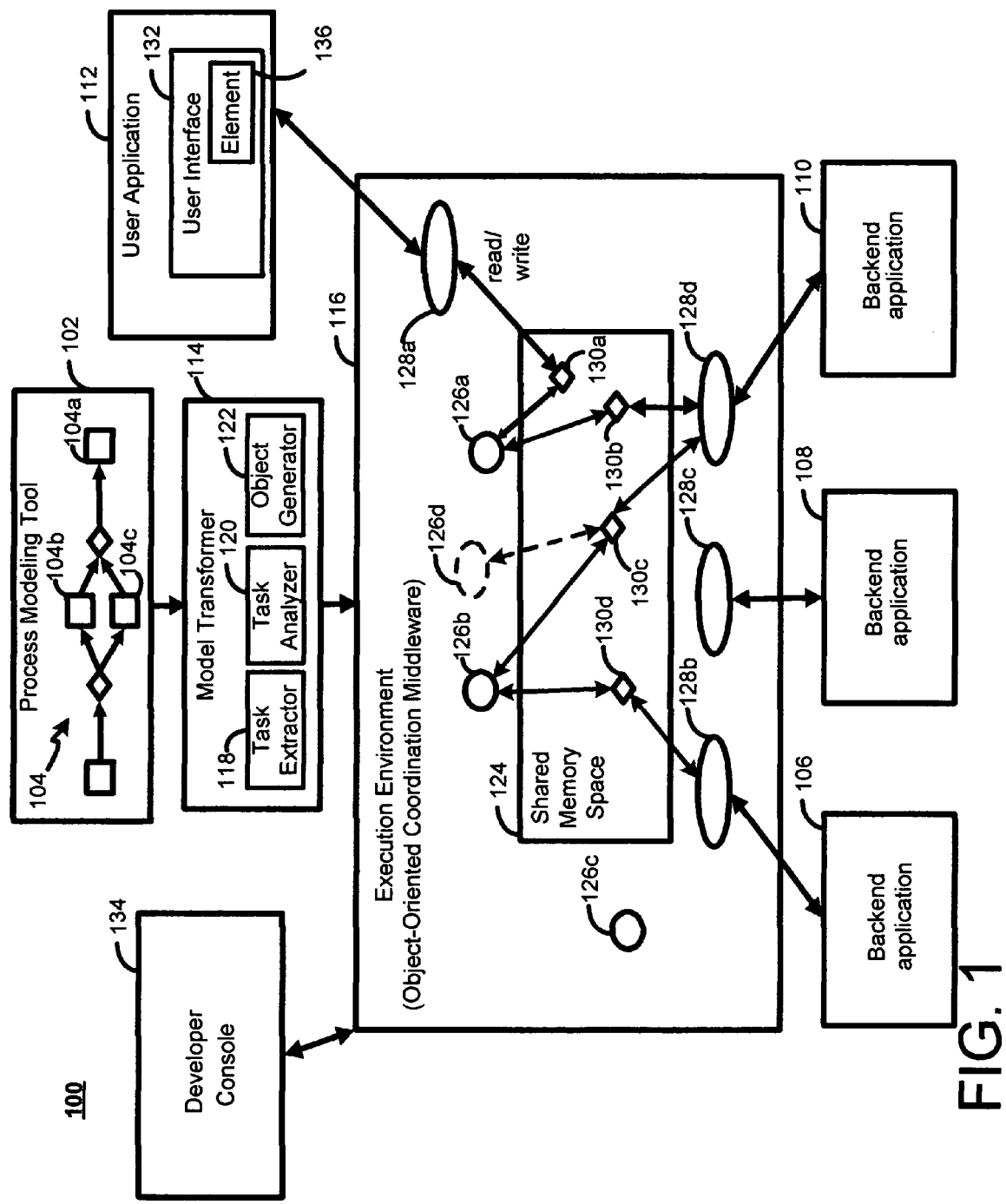
FIG. 1 is a block diagram of an example system for providing and executing event-based coordination of process-oriented software applications.

FIG. 1 is a block diagram of a system 100 for providing and executing event-based coordination of process-oriented software applications, such as, for example, a packaged composite application. For example, by representing tasks of a defined process as loosely coupled (or decoupled) objects and/or events, the system 100 allows for implementations in which a composite application may be enriched with new features or with new (additional) applications, or may be modified to meet special circumstances or demands (e.g., to personalize the composite application to the needs of a particular user or group of users), simply by, for example, providing new or modified ones of the objects and/or events (or relationships therebetween). Thus, the system 100 is operable to translate a process-oriented application into an event-based application that is amenable to such runtime adaptation, and that exhibits various other features and advantages that are discussed in more detail below.

In FIG. 1, then, a process modeling tool 102 is illustrated that may be used to produce a process model 104. For example, the process modeling tool 102 may include a graphical user interface in which tasks (which also may be referred to or known as activities, actions, task nodes, and so on) are represented as blocks or some other designated shape, while control nodes (which help define possible paths through the tasks) may have one or more other shapes. In this way, a developer or other user may use the process modeling tool 102 to join the task and control nodes of the process model 104 graphically in a desired order, and with a desired relationship to one another.

Tasks of the process model 104 may each relate to one or more functionalities of a plurality of backend software applications that are represented in FIG. 1 as applications 106, 108, and 110. In this way, the process model 104 conceptually represents a process-oriented composite application that aggregates functionality from the representative applications 106, 108, and 110 by specifying interconnections between the applications 106, 108, and 110.

As referenced above, the software applications 106, 108, and 110 may have well-defined functions and capabilities, and may represent, for example, Human Resource Management (HRM) applications, Supply Chain Management (SCM) applications, Customer Relationship Management (CRM) applications, or virtually any other type of software that has the ability to present discrete elements or components of its functionality for use by a composite software application (other examples of which are provided herein). For example, the applications 106, 108, and 110 each may implement an Enterprise Services Architecture (ESA) and/or Enterprise Application Integration (EAI) solution that is designed to allow the applications 106, 108, and 110 to present their respective services and/or functionalities for use in composing a Packaged Composite Application (PCA), the behavior of which may be governed and/or described by the process model 104. Specific examples of such composite software applications are provided in more detail herein, but it should be understood that such composite software applications may take advantage of the features of the applications 106, 108, and 110 to provide a variety of advantages over a similar application that may be built from the ground up, where such advantages may include, for example, increased speed of deployment, as well as improved performance, scalability, resource sharing, and reliability.

The composite software application may then be implemented by a developer or other user (not shown in FIG. 1) as a user application 112. The user application 112 may run on, for example, a computing device such as, for example, a Personal Digital Assistant (PDA), a cell phone, a laptop or tablet computer, or virtually any other type of computing device.

As just mentioned, the process model 104 may be used to govern and/or describe a behavior of the (composite) user application 112, e.g., by being deployed within a process management engine (not shown). In FIG. 1, however, the system 100 includes a model transformer 114 that is operable to transform the process-oriented description of the composite application (i.e., the process model) into an event-based coordination of the tasks of the process model 104, to be implemented within an execution environment 116.

For example, the execution environment 116 may represent a coordination infrastructure or coordination middleware that is operable to implement such event-based coordination models. The execution environment 116 may support, for example, event publishing, data transfer/sharing, and complex event subscription(s), association(s) of reactions to event occurrences, and runtime re-configuration so that new event subscriptions and reaction rules may be added as needed.

In the example of FIG. 1, and in various other examples described herein, the execution environment 116 is illustrated as an Object-based Coordination Middleware (OCM), which is an example of coordination middleware having roots in the "tuple space model" (in which a repository of elementary data structures, or "tuples" allow multiple processes to communicate with one another via the repository). Such coordination middleware allows cooperation between the applications 106, 108, 110, and 112 through a flow of objects into and out of one or more object spaces, or memories. That is, for example, and as described in more detail below, components (or processes) of the applications 106, 108, 110, and 112 may use persistent storage of the execution environment 116 to store objects, both to communicate with one another and to coordinate actions by exchanging objects through the space(s).

The model transformer 114 is operable to input the process model 104 and output objects to be used in the execution environment 116. More specifically, the model transformer 114 includes a task extractor 118 that is operable to remove each of the tasks from the process model 104 for analysis by a task analyzer 120. The task analyzer 120 also may use information regarding transitions between the tasks of the process model 104, information regarding control nodes of the process model 104 (e.g., splits, joins, or other decision points for routing through the tasks of the process model 104), or other available information, in order to analyze the tasks and/or other features of the process model 104. Then, an object generator 122 is operable to use results of the analysis of the task analyzer 120 to generate objects for use in the execution environment 116 to coordinate implementations of instances of the process model 104.

As referenced above, the execution environment 116 may include an object-oriented coordination middleware into which the objects generated by the object generator 122 are deployed, and which itself may contain a shared memory space 124. Coordination between the applications 106, 108, and 110 occurs through additional objects (e.g., passive objects) being written and taken from the memory space 124 within the execution environment 116. As described below, some of the objects written to the memory space 124 may correspond to data designated to flow from one of the applications 106, 108, or 110 to another, while other ones of the objects may provide a signposting function, e.g., indicating that a given task of the process model 104 has been completed or that a given task is enabled but has not yet started.

More particularly, in the example of FIG. 1, the object generator 122 deploys objects 126 and 128, which may have their own thread(s) of execution, and that may be referred to herein as coordinators (or, more specifically, may be referred to as routers or connectors, respectively), and which generally include objects or other types of software entities that are deployed into the coordination middleware 116 to coordinate tasks of the process model 104. The coordinators 126 and 128 may, for example, operate in a loop until suspended or destroyed, with each iteration including waiting for an event (e.g., an addition to the memory space 124 space of an object 130 or an interaction initiated by the external application 112), performing internal processing and/or interacting with the (external) applications 106, 108, 110, and writing one or several objects 130 to the memory space 124.

In the example of FIG. 1, and as referenced above, coordinators are further classified as the routers 126 and the connectors 128. According to this example, and as described in more detail herein, the routers 126 are responsible for internal coordination activities within the execution environment 116, so that such internal coordination activities may be maintained separately from the actions of the connectors 128, which are responsible for communicating with the external applications 106, 108, and/or 110. Of course, other classifications of coordinators 126/128 may be used.

Thus, the connectors 128 represent a type of coordinator dedicated to enabling a connection between the memory space 124 and the applications 106, 108, 110, or 112. The connectors 128 take into account the possibility that the applications 106, 108, 110, or 112 generally may not be programmed to interact with the execution environment 116 (and/or the memory space 124) but may instead rely on other communication protocols and interfaces.

In contrast, the routers 126 (which also may be referred to as control routers) react to the arrival of one or more of the object(s) 130 to the memory space 124 and perform some processing before producing a new object(s) 130 for writing onto the space 124. The processing that the routers 126 perform may be, for example, translation of data using a specified operation. Such operations may include, for example, an arithmetic operation, or more complex operations, such as, for example, checking that a purchase order is valid.

Although specific examples, implementations, and operations of the system 100 of FIG. 1 are provided in detail below, and with reference to specific ones of the routers 126a-126d, connectors 128a-128d, and objects 130a-13d, it may be understood from the above that the system 100 allows for execution of an instance of the process model 104, using an event-based coordination of the tasks of the process model 104 for the particular instance. For example, the connectors 128 may represent the tasks of the process model 104, so that the connectors 128 interact with the applications 106, 108, and/or 110 to provide a packaged composite application 112 that may operate according to the process model 104. Meanwhile, each of the routers 126 may represent one of a possible plurality of paths or routes through the process model 104 to a particular one of the tasks of the process model 104.

For example, tasks 104a, 104b, and 104c of the process model 104 may be performed by corresponding ones of the connectors 128 (in association with the external applications 106, 108, and/or 110, as described herein). As may be observed from the simple example of the process model 104, the task 104a may be activated by a first input resulting from a first path through a task 104b (i.e., in response to a completion of the task 104b), or a second input resulting from a second path through a task 104c (i.e., in response to a completion of the task 104c). Accordingly, the routers 126 may include a first router relating to an activation of the task 104a resulting from a completion of the task 104b, and a second router relating to an activation of the task 104a resulting from a completion of the task 104c.

Thus, although a particular instance of the process model 104 may activate only one of the tasks 104b and 104c (e.g., by activating a corresponding connector(s)), the event-based coordination of an instance of the process model 104 within the execution environment 116 contemplates either or both of these possibilities (e.g., by having a router associated with each). As a result, the routers 126 are able to control a flow of data through the memory space 124 and to/from the connectors 128 (and possibly to/from other routers), using the objects/events 130, in a manner analogous to the way that data would be controlled within an instance of the process model 104. Accordingly, the application 112 may be experienced and/or implemented by a user, perhaps by way of a user interface 132, in the same or similar manner as if the application 112 were governed by the process model 104.

Additionally, however, the event-based coordination of the process model 104 allows for additional advantages, such as, for example, run-time adaptation of the process model 104. For example, a software developer (not shown) who may wish to modify the behavior of the user application 112 at a developer console 134, perhaps to include a new or modified element 136 within the user interface 132, may do so, e.g., simply by encoding a new router for addition to the execution environment 116. Such a router (e.g., the router 126d, shown in dashed lines in FIG. 1) may serve, for example, to effectively intercept data (e.g., by subscribing to certain events/objects 130) for processing in a manner not envisioned by the process model 104. For example, the router 126d may allow elimination of certain tasks of the process model 104 (e.g., one of the tasks 104b or 104c), or may allow processing of the tasks of the process model 104 in a different order. Similarly, an addition of a new router and/or connector may allow for the performance of an entirely new task within a given instance of the process model 104.

Thus, the system 100 maintains many or all of the advantages of the process model 104, such as, for example, an ability to visualize and understand dependencies between the applications 106, 108, and 110 in implementing the composite application 112, in a convenient and consistent manner. Additionally, the system 100 may reduce or eliminate a need to change and re-deploy the process model 104, in order to provide modified or enhanced capabilities within the application 112.

In other words, the system 100 allows for translation of the process model 104 of the composite application 112 into an event-based model(s) for use in a runtime environment, so that, thereafter, for example, event-based rules (e.g. event subscriptions related to a specific task) may be added or removed (e.g., the router 126d), with a result of overlaying behavior on top of the composite application 112, even if the composite application 112 has already been deployed. In this way, users, administrators and/or developers can re-route data and/or control in an already-deployed composite application, perhaps in response to special requirements or unforeseen situations, in order to steer the data and/or control into executions paths not foreseen in the process model 104, and may thereby facilitate the personalization and adaptation of the application 112 and similar applications. As a result, such runtime adaptation and/or re-configuration of an instance of the process model 104, i.e., without requiring alignment between each execution of the composite application 112 and the process model 104, may be advantageous to the users, developers, and/or administrators.

For example, such ad hoc flexibility mechanisms may be instrumental for purposes such as personalizing applications to suit requirements or preferences of specific users, or adapting the behavior of composite applications based on the users' context (e.g. location, device, or network connection) without overloading the process model with such details. Other examples include hot-fixing the composite application to address unforeseen errors (as opposed to predicted exceptions), and/or to add new features (e.g. to plug-in new applications or to re-route tasks and data).

As mentioned above, most or all of the features and advantages of the process model 104 may be retained, since, for example, the process-based and event-based views of the application 112 may co-exist, and the process model 104 may be used if desired or necessary. The process and event views may then be synchronized offline. For example, if any changes implemented through the event-based coordination/model are desired to be maintained, then the process model 104 may be changed and re-deployed accordingly for future use.

As described herein, the execution environment of the example of FIG. 1 illustrates an object-oriented coordination middleware. In this context, coordinating objects (also referred to herein as coordinators) may refer to objects having their own thread of control that may run on the coordination middleware (e.g., the object-oriented coordination middleware 116). As such, coordinators may be deployed, suspended, resumed, and/or destroyed by applications running outside the memory space 124 at any time. Moreover, coordinators may read and write passive objects to/from the space, subscribe to events, and receive notifications from the space, including notifications from the shared memory space 124. Thus, for example, such coordinating objects, as opposed, for example, to passive objects, may have a special execute method that may be invoked on a dedicated thread of control when the coordinating object is written into the coordination middleware/space 116/124.

These and other features of coordinators are discussed herein in the context of various ones of the specific examples provided. However, even though certain examples are described in these terms herein, it should be understood that other execution environments and/or middleware may be used. For example, other types of object-oriented coordination middleware may be used, including, for example, publish/subscribe middleware supporting composite events. In such implementations, for example, dedicated applications operating outside the space(s) may be used to coordinate the events of the instance of the process model 104. Additionally, or alternatively, applications may be used that operate on top of a messaging bus in a publish/subscribe middleware.

Figure 2:
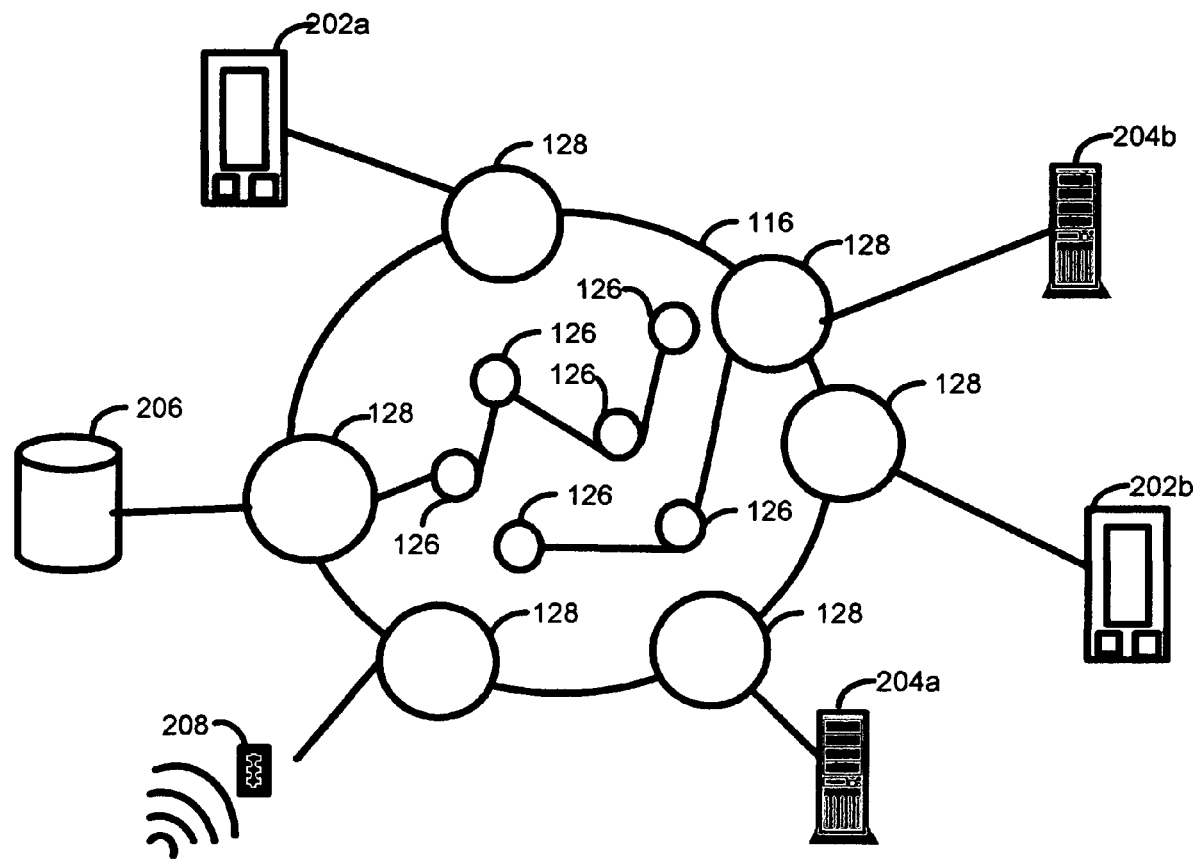
FIG. 2 is a block diagram of an implementation of the system of FIG. 1.

FIG. 2 is a block diagram of an implementation of the system 100 of FIG. 1. In FIG. 2, the illustrated example provides a more general setting and implementation than that of FIG. 1. Specifically, FIG. 2 illustrates that the connectors 128 may be connected to many different types of applications, which themselves may be running in many different contexts.

For example, the connectors 128 may be connected to mobile device 202a and 202b, which may be running the user application 112 of FIG. 1 or a similar application. Additionally, the connectors 128 may be in communication with services 204a and 204b, e.g., with application services and/or web services that are known to provide discrete functionality over a network. In the latter example, the connector(s) 128 may be a coordinating object that calls the external web service(s) 204a/204b when an object of a certain type is written to the memory space 124, like, for example, an object written by one of the routers 126 that indicates that a certain previous task has been completed. The latter example shows that the connectors 128 may be used as a mechanism to detect that a given task is enabled and thus that a given one of the applications 106, 108, and/or 110 should be invoked in order to perform this task.

The services 204a and 204b may exchange messages with one or more of the connectors 128 using for example the Simple Object Access Protocol (SOAP) and/or Extensible Mark-up Language (XML) formatting, using a mutually-agreeable communications protocol, such as, for example, the Hyper-Text Transfer Protocol (HTTP) or the Simple Mail Transfer Protocol (SMTP). As is known, the service 204a and/or 204b may be discovered by way of a directory of services, such as, for example, the Universal Description, Discovery, and Integration (UDDI) directory, a distributed directory or registry designed to allow parties to find a given service/functionality on a network. The UDDI uses a language known as the Web Services Description Language (WSDL), which is an XML-formatted language designed to describe capabilities of the web services in a way that allows requesting clients to take advantage of those capabilities.

Although the services 204a and/or 204b may provide discrete components of large enterprise applications, such as the CRM and/or SCM applications described above, the services 204a and/or 204b also may provide smaller, more elementary services, such as, for example, providing a stock quote, weather report, purchasing information, ticket reservation capability, auction functionality, or many other types of services. Thus, the system 100 may incorporate any such services, as well as other types of the applications 106, 108, and/or 110 into the packaged composite application 112 that may be running on the mobile devices 202a and/or 202b. Additionally, of course, such packaged composite applications need not run only on mobile devices, but may be advantageously implemented in virtually any computing environment, including, for example, desktop or workstation environments.

Further in FIG. 2, the connectors 128 may be in communication with one or more databases 206, which may allow the system 100 access to various types of data or information that may be useful in the context of the application 112. Finally in FIG. 2, the connectors 128 may be in communication with one or more sensors 208.

For example, one of the connectors 128 may communicate with the sensor 208 for the purpose of relaying context data between the sensor 208 and the execution environment 116. Such a one of the connectors 128 may, for example, receive or poll data from the sensor 208, encode such data as a passive object(s), and write this object(s) into the memory space 124, possibly overriding an existing object that contains the previous known state of the relevant context data.

Figure 3:
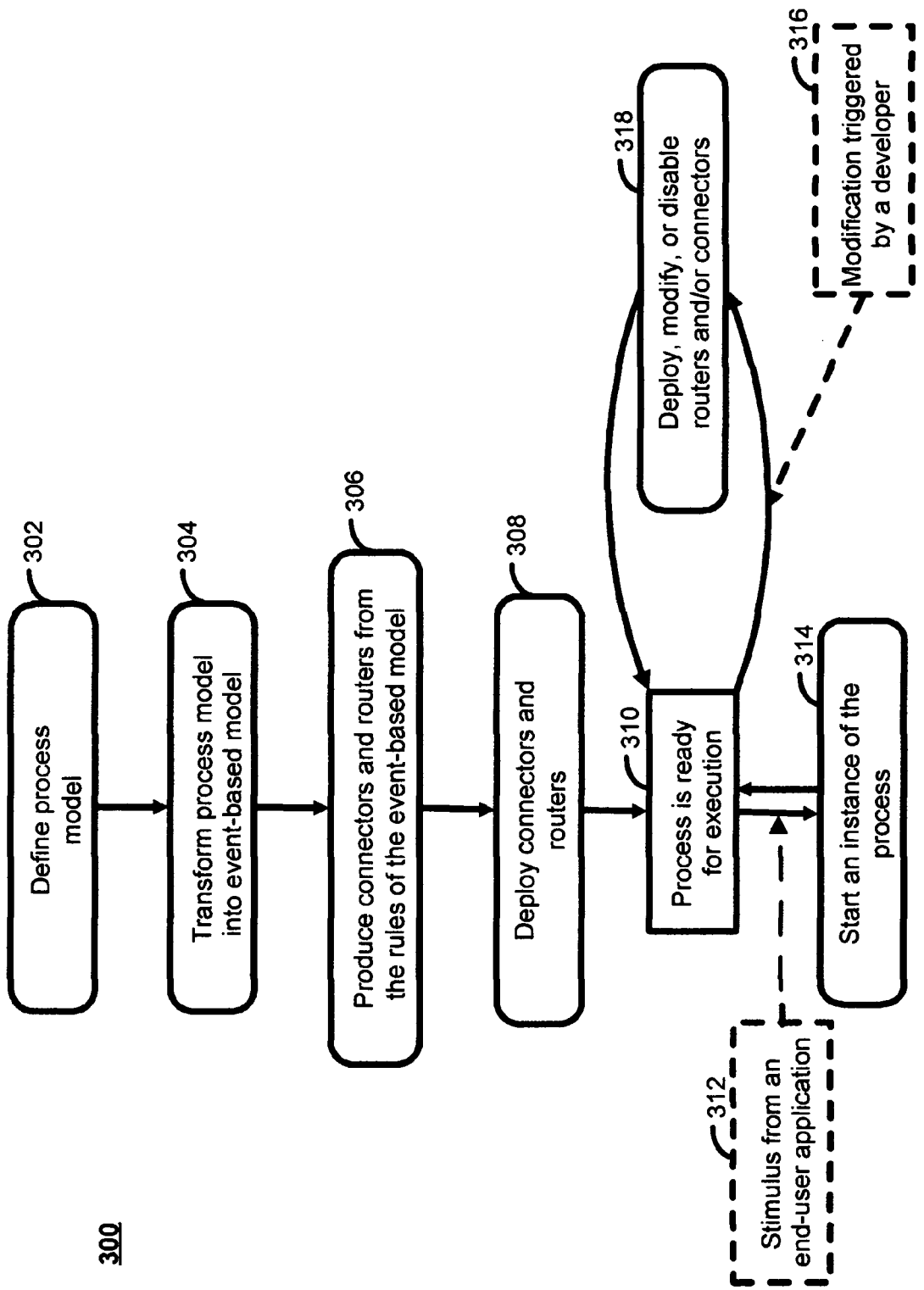
FIG. 3 is a flowchart illustrating a process that may be implemented by the system of FIG. 1.

FIG. 3 is a flowchart 300 illustrating a process that may be implemented by the system 100 of FIG. 1. In FIG. 3, a process-oriented composite application is converted into an event-based coordination model that is deployed for use by end users.

Specifically, a process model is defined (302). For example, a developer may use the process modeling tool 102 of FIG. 1 to define the process model 104. Then, the process model is transformed into an event-based model (304). For example, the model transformer 114 of FIG. 1 may be used to define rules by which the process model 104 may be implemented as an event-driven coordination of the desired composite application within the execution environment 116.

Then, coordinator objects (e.g., connectors and routers) may be produced from the rules of the event-based model (306). For example, such objects may be produced by the object generator 122 of FIG. 1. The connectors and routers may then be deployed (308) into an execution environment. For example, the connectors 128 and the routers 126 may be deployed into the execution environment 116 of FIG. 1.

At this point, a process according to the process model 104 is ready for execution (310). For example, execution of an instance of the process of the process model 104 may result from stimulus (e.g., request) received from an end-user application (312), e.g., the application 112. In this case, an instance of the process is begun (314). For example, a user may run an instance of the process of the process model 104 using the user interface 132 of the user application 112. Execution of the process instance is described in more detail herein, but, as should be understood from the description of FIGS. 1 and 2 above, the application 112 may execute largely as if the process model 104 were deployed and executed on a process execution engine.

In some cases, however, a modification of the event-based coordination model may be triggered (316). Such modification may involve, for example, deploying new routers and/or coordinators as well as disabling and/or modifying existing ones (318). This modification may affect one or several already running instances of the process and/or new instances that are started after the modification. For example, a developer may use the developer console 134 of FIG. 1 to make a modification to the execution environment 116 of FIG. 1, e.g., by adding a new router 126 to the execution environment 116. In this way, for example, when a following new instance of the event-based process is begun (314), a new feature of the application 112 may be available for the particular instance. For example, the element 136 may be included that allows a user the benefit of some new functionality. In other examples, the modification need not be visible to the user as an active choice to be made by the user, and may instead simply reflect a change in execution of the instance, due to, for example, a context of the user and/or the user device, a desire of an employer of the user, or some other criterion.

Figure 4:
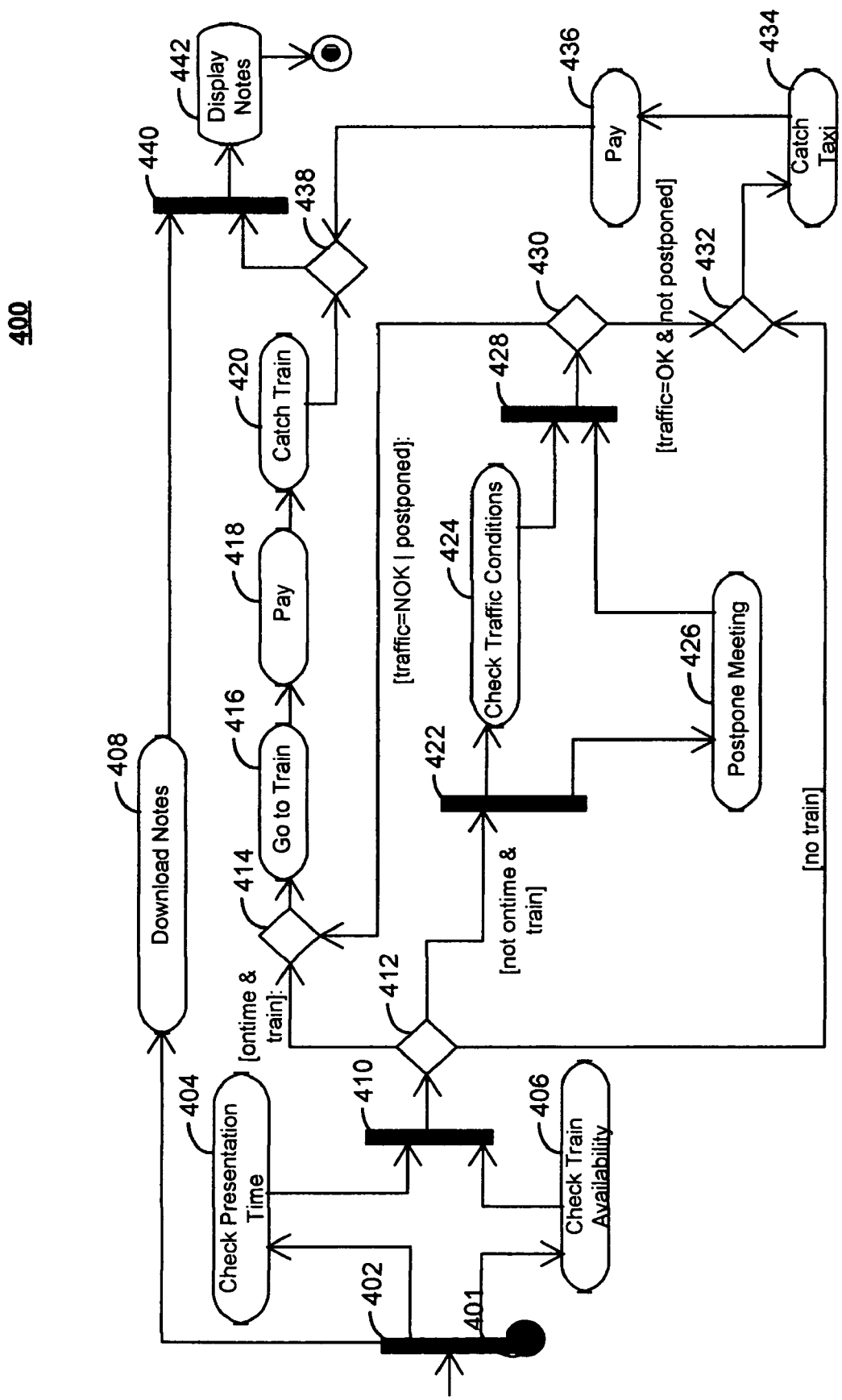
FIG. 4 is an activity diagram that may be operated upon by the system of FIG. 1.

FIG. 4 is an activity diagram 400 that may be operated upon by the system 100 of FIG. 1. In FIG. 4, the activity diagram 400 is a Unified Modeling Language (UML) diagram that is used to described a process model, such as the process model 104 of FIG. 1. Such a UML activity diagram uses notation and form that may be considered to be representative of the notations and forms found in other process modeling and/or process execution languages, including, for example, sequence, fork, join, decision, and merge nodes that serve to control a flow of data between tasks of the model/diagram. As such, the described techniques may easily be adapted to other process modeling languages that rely on these and similar constructs, such as, for example, the business process modeling notation (BPMN).

In FIG. 4, the illustrated scenario is an example of a personal workflow, i.e., a process 400 aimed at assisting a user in the achievement of a goal that requires the execution of a number of tasks. Most of the tasks composing the process (but not necessarily the process itself) are intended to be executed in a mobile device. Thus the scenario is also an example of a mobile workflow. Such mobile and personal workflows constitute a class of process-oriented composite applications in which personalization and runtime adaptation may be beneficial. Of course, such requirements also may be found in more traditional applications (e.g., order handling) and the proposed techniques are also applicable in these settings.

In the example, a user is on a trip to attend a meeting. Before the meeting commences the user runs a process-oriented application modeled in FIG. 4, in order to obtain assistance in a lead-up to the meeting. After an initial node 401, a bar 402 (and similar bars, discussed herein, which may be referred to as parallelism bars) represents a start of potentially parallel processes. In particular, a task 404 is associated with checking a presentation time, while a task 406 is associated with checking an availability of trains to the destination, and a task 408 is associated with downloading meeting notes to the user's device (which may or may not take some non-trivial amount of time, e.g., due to low bandwidth).

A parallelism bar 410 specifies further parallel processes. In particular, after the presentation time 404 and the train availability 406 have been checked, three options are available, as indicated at a decision point 412. Specifically, if the user is "on time" AND "there is a train" that would take the user near the meeting's location, then a decision point 414 is reached, after which a task 416 associated with going to the train leads to a payment task 418 for a train ticket, and a subsequent task 420 associated with catching the train.

If, at the decision point 412, the user is "not ontime" AND "there is a train," then a parallelism bar 422 signifies a start of a task 424 associated with checking traffic conditions and a task 426 associated with postponing the meeting. The tasks 424 and 426 thus assist in determining if a taxi or a train is the best option for the user. Specifically, as just referenced, the process 400 checks the traffic conditions 424 and, in parallel, tries to postpone the meeting by, for example, one hour 426.

These parallel processes are rejoined at a bar 428, and then a decision point 430 determines that if the traffic is adverse (i.e., "not ok"), then there is no point in catching a taxi, and the process 400 will advise the user to catch the train by routing back to the decision point 414. If the meeting is postponed 426, the same result occurs.

If, however, there is favorable traffic and the meeting can not or will not be postponed, then the decision point 430 directs the user to a further decision point 432, and the process moves to a task 434 associated with catching a taxi to get there sooner and on time. A similar result occurs if, at the decision point 412, there is "no train," then the decision point 432 is reached and a taxi is automatically ordered for the task 434. In either case, a payment task 436 leads to a decision point 438, where, for example, payment may be automatically arranged by the composite application associated with the process 400, and the details of the payment may be sent to a finance department to arrange for a refund (where both of these features are modeled in FIG. 4 as the single tasks 418 and/or 436). Finally, a parallelism bar 440 indicates that once the user is on his/her way to the meeting, and the meeting notes have been downloaded, then the composite application may execute a task 442 for displaying the notes, and the process 400 ends.

Figure 5:
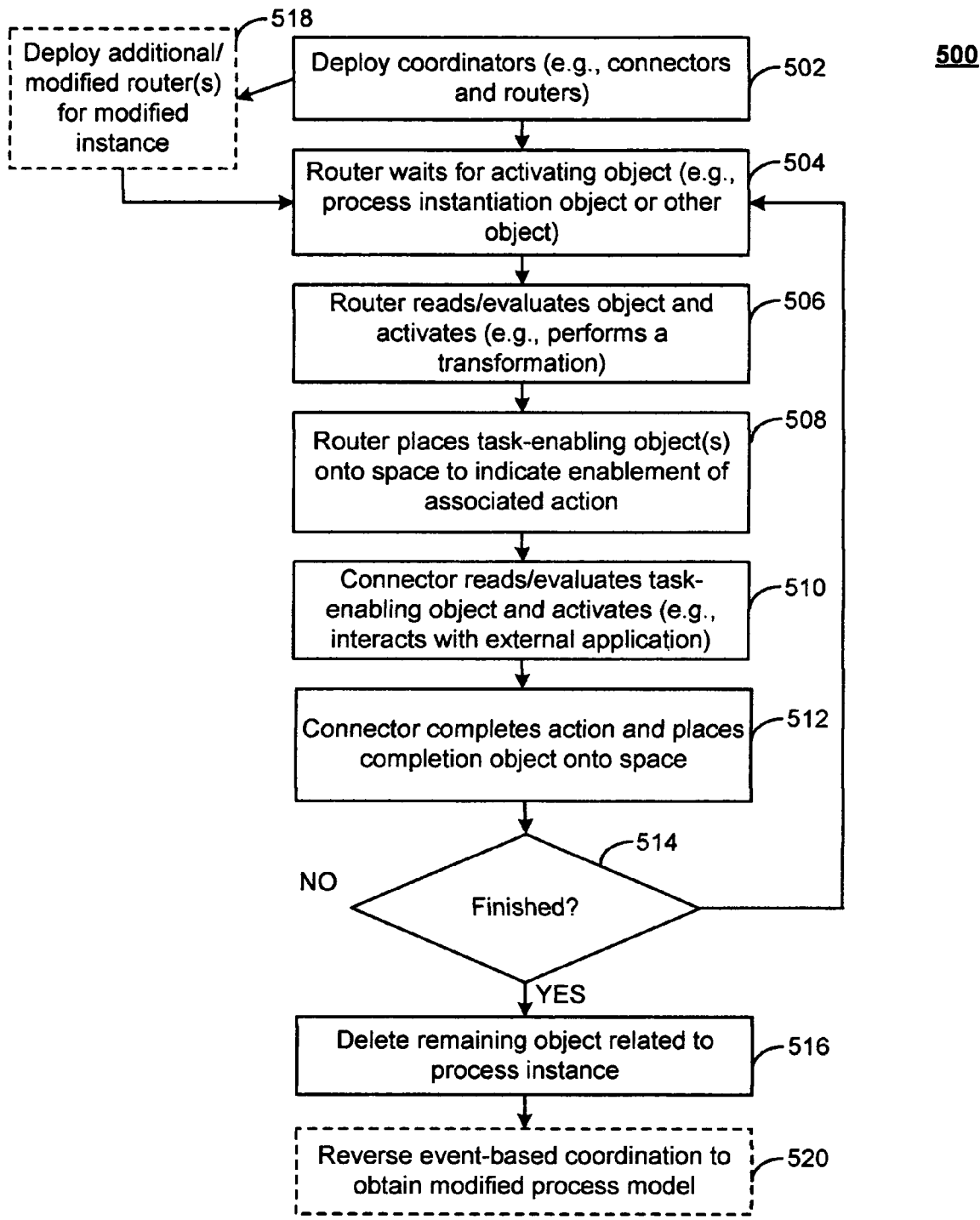
FIG. 5 is a flowchart illustrating operations of implementations of the system of FIG. 1.

FIG. 5 is a flowchart illustrating operations of example implementations of the system of FIG. 1, with reference to specific examples provided in the context of FIG. 1. More specifically, FIG. 5 primarily illustrates examples of features and operations of the execution environment 116.

In FIG. 5, coordinator objects are deployed (502) within the execution environment, e.g., upon generation thereof by the object generator 122. In the example of FIG. 1, the coordinator objects are classified as the connector objects 128 that are used to communicate with external applications, and the router objects 126 that are used to define a sequence and type of activations of the connectors 128, according to the process model 104 (and/or modifications thereof). Of course, other classifications may be used.

Once deployed, a router object waits for an activating object (504). For example, in FIG. 1, the router 126a may wait for an event/object 130a, which may be an instantiation object placed onto the space 124 by the connector 128a, in response to a request from the application 112 (e.g., as in 312 and 314 in FIG. 3), or, as described below, may be a completion object from a connector 128 indicating a task completion by that connector. The router (e.g., the router 126a) then reads and/or evaluates the activating object and activates some active internal process (506), such as, for example, performing some type of transformation that corresponds to advancing a sequence or flow of the process model 104. More detailed examples of these and related operations of the routers 126 are provided herein, e.g., with respect to FIG. 6.

The router(s) then place a task-enabling object(s) onto the space 124, thereby to indicate enablement of an associated action (508). For example, the router 126a may then place an object 130b onto the space 124, which may be a task-enabling object for the connector 128d. Connector(s) may thus read/evaluate the task-enabling object and activate (510). Continuing the above example, the connector 128d may then activate the application 110, in order to perform an appropriate task. The connector may thus complete the action and place a completion object onto the space. For example, the connector 128d may complete its associated task and then write a completion object 130c onto the space 124. Further details of examples of the operation and use of the connectors 128 are provided herein, e.g., in the context of FIG. 7, below.

If the process 500 is not finished (514), then the process 500 continues with the routers 126 waiting for an activating object (504), and so on. For example, the router 126b may read the object 130c (506), and write the object 130d (508) for reading by the connector 128b (510). Such an event-based process may continue, although not shown in detail in FIG. 1, until the process 500 is finished (514). At this point, remaining objects related to the just-completed instance of the process 500 (e.g., the process model 104) may be deleted (516).

In the context of the example of FIG. 4, FIGS. 1 and 5 illustrate that some or all of the tasks 404, 406, 408, 416, 418, 420, 424, 426, 434, 436, and/or 442 may be represented and enacted within the execution environment (e.g., coordination middleware) 116 as ones of the connectors 128 of FIG. 1, interacting with appropriate external applications. Meanwhile, the remaining elements of FIG. 4, including the various parallelism bars, decision points, and transitions within and among these elements and the various tasks, as illustrated in FIG. 4, may be represented and replicated using the routers 126. In this way, and as described in more detail herein, the routers 126 may represent the various potential paths through an enacted instance of the model 400 (e.g., may represent a path from a selected task to a consecutive task, possibly through ones of the bars, decision points, and/or transitions).

As already mentioned, such an event-based coordination of the process model 104 may, in many cases, not appear substantially different to a user than if a conventional process-based coordination were used. However, the event-based coordination described herein provided various other advantages and features that may not be available in a process-based implementation. For example, as discussed herein, the event-based coordination allows for modifications to the instance of the process model 104 being executed, yet without requiring a change to the process model 104 itself.

For example, and as described in more detail herein, an additional router may be deployed into the execution environment 116 (518). For example, in FIG. 1, the router 126d may be deployed into the coordination middleware 116 (as in 316 and/or 318 of FIG. 3). Additionally, or alternatively, existing routers may be disabled or modified, in order to allow the new and/or other modified router(s) to perform their revised functionality. For example, router 126b may be disabled so that it will no longer attempt to take object 130c.

Once deployed, the new or modified router simply acts, at a design level, as any one of the other routers, e.g., the modified router 126d acts as one of the routers 126. For example, the router 126d may simply wait for an activating object for its internal transformation (e.g., by subscribing to objects having activating characteristics, as described, for example, with respect to FIG. 6), and then read the object 130c (506, 508), rather than the router 126b reading the object 130c. Accordingly, a flow or sequence of the process model 104 may be altered, as the router 126d would then continue by placing a task-enabling object onto the space 124 (not shown in the example of FIG. 1) that would, presumably, activate another connector than the connector 128b (or would activate another characteristic thereof). Similar comments may apply to new or modified connectors 128 that may be written to the coordination middleware 116. Also, further details and examples of such adaptations of a process instance are described in more detail below, for example, with respect to FIG. 8 and with reference to the working example of FIG. 4.

In the case that the process instance is modified in the above-described manner, it should be understood that no modifications to the process model 104 are necessary, and, in fact, it is an advantageous feature of the system 100 that such modifications are not required, since implementing changes to the process model may require substantial efforts, as well as a full-scale re-deployment of the model 104. Nonetheless, the modification implemented may provide such a useful functionality or advantage that a developer may, in fact, wish to make a corresponding change to the process model 104, even if re-deployment or other efforts are required. In this case, the event-based coordination resulting from the addition/modification of the router 126d may be reversed (e.g., an action of the model transformer 114 may be reversed) in order to arrive at a modified process model (520), that may then be re-deployed either for process-based execution in an execution engine, or for continued event-based coordination in the execution environment 116 or the like.

Figure 6:
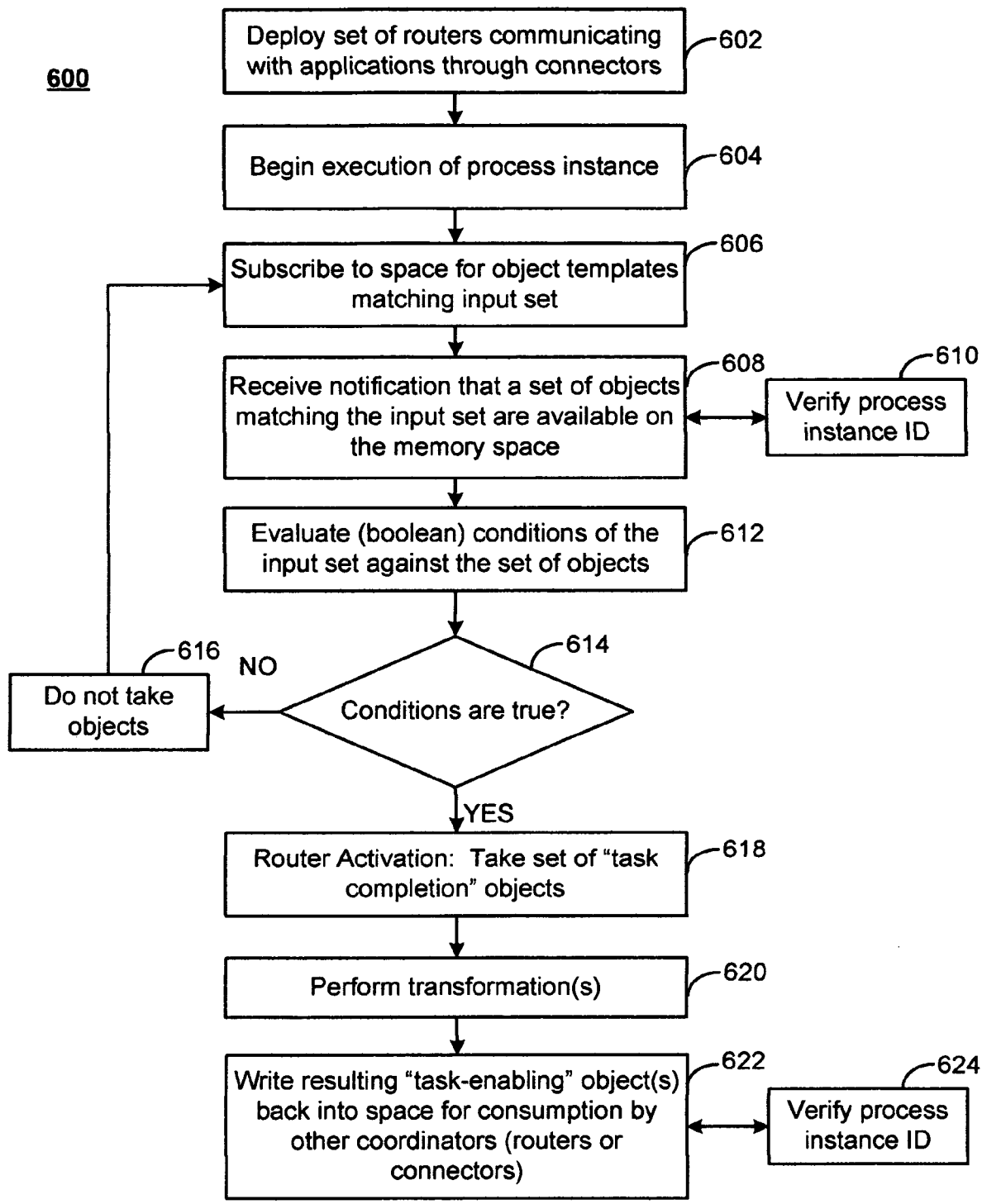
FIG. 6 is a flowchart illustrating operations of implementations of the system of FIG. 1.

FIG. 6 is a flowchart 600 illustrating further examples of operations of implementations of the system of FIG. 1. In particular, FIG. 6 illustrates example operations of the routers 126. Although such operations may be performed in the context(s) of the various examples above, e.g., in the example of FIG. 5, FIG. 6 focuses primarily on operations of the routers (e.g., 502, 504, 506, 508 in FIG. 5).

In FIG. 6, a set of routers are deployed to communicate with applications through simultaneously-deployed connectors (602). For example, the routers 126 may be deployed into the execution environment 116, as already described.

As referenced herein, the object-oriented coordination middleware 116 may support undirected decoupled communication based on four elementary operations, namely read, write, take and notify. In this case, a read operation copies an object from the memory space 124 that matches a given object template; a take operation moves an object matching a given object template out of the memory space 124; a write operation puts an object on the memory space 124; and a notify operation registers a subscription for a composite event expressed as a set of object templates. Whenever there is a combination of objects present in the space that matches these object templates, an event occurrence will be raised and a notification will be sent to the subscriber (e.g., one of the routers 126). An object template is an expression composed of a class name and a set of equality constraints on the properties of that class. An object matches a template if its class is equal to or is a sub-class of the class designated by the template and it fulfills the template's constraints.

Thus, after an execution of a process instance begins (604), e.g., by receiving an appropriate user request, and/or upon its creation/deployment, a particular router 126 may place a subscription with the shared memory space 124 for a set of object templates contained in its input set (i.e., an input set obtained after removing the boolean conditions from the input set) (606).

For example, in this context, the routers 126 generally may each be described by an input set, which includes a set of object templates and boolean conditions, and an output, which includes a set of expressions, each of which evaluates into an object. To apply this terminology to the example of FIG. 4, an input set for the "go to train" task 416 may include a first object template associated with the "check presentation time" task 404, as well as a second object template associated with the "check train availability" task 406. The Boolean condition AND may be applied, such that the "go to train" task 416 is only completed if the presentation is on time AND the train is available/on-time (possibly among other conditions). The output would then include an object activating the "go to train" task (connector).

Thus, in FIG. 6, one of the routers 126 would receive notification that a set of objects in the memory space 124 matches its input set (608). In conjunction, a process instance ID (referred to herein as piid) may be verified (610). In this way, it is ensured that the objects being evaluated belong to the same instance. Otherwise, for example, a first instance of the process 400 may occur in which a train is on-time, while the presentation time is delayed, while in a second instance (which may be executing simultaneously with the first instance in the execution environment 116) the reverse may be true. Thus, both instances should be separately identifiable, in order to ensure the validity of each.

Once the set of objects is detected, then the corresponding Boolean conditions may be evaluated (612). For example, one of the routers 126 may detect the first object template associated with the "check presentation time" task 404 mentioned above, as well as the second object template associated with the "check train availability" task 406, also mentioned above. Although these object templates may be detected (608), it is the evaluation of the corresponding Boolean conditions (612) that determine which of the three transitions leaving the decision point 412 is followed. In other words, a router associated with each of the "go to train" task 416, the "check traffic conditions" task 424, the "postpone meeting" task 426, and the "catch taxi" task 434 would receive notification that a set of objects matching their respective input set(s) are available on the memory space 124 (608), and an evaluation of the imposed Boolean condition(s) at each of the respective routers would determine which of the routers would then place an output object onto the memory space 124 to activate its respective connector (task).

Thus, if the Boolean conditions are not evaluated at a particular one of these routers as being true (614), then the particular router will not take the objects from the memory space 124 (616). For the router evaluating the conditions as true, however, activation occurs and the router will take the set of objects (618) and perform appropriate transformations (620), e.g., will evaluate transformation functions (i.e., expressions in the output) taking the set of objects as input. The objects resulting from the transformation are then written back to the memory space 124 (622), where the resulting objects may be read by a connector (see, e.g., FIGS. 5 and 7), or by another router. At this point, the process instance ID piid may be verified again (624), although it should be understood that the piid may be evaluated at any appropriate point in, for example, the processes 500, 600, and/or 700 (of FIG. 7, below).

The input set thus captures the events and conditions that lead to the activation of a router (where an event corresponds to the arrival of one of the objects 130 to the memory space 124). The output, on the other hand, encodes the events that the router will produce upon activation, i.e., the objects to be placed in the space 124 for consumption by other coordinators.

Finally, if a set of objects matching the object templates in the stop set of a router (e.g., a set containing a combination of object templates and Boolean conditions) is found on the space, the router will terminate its execution and replace itself by the set of routers specified in the replace set (e.g., a set of other coordinators).

Figure 7:
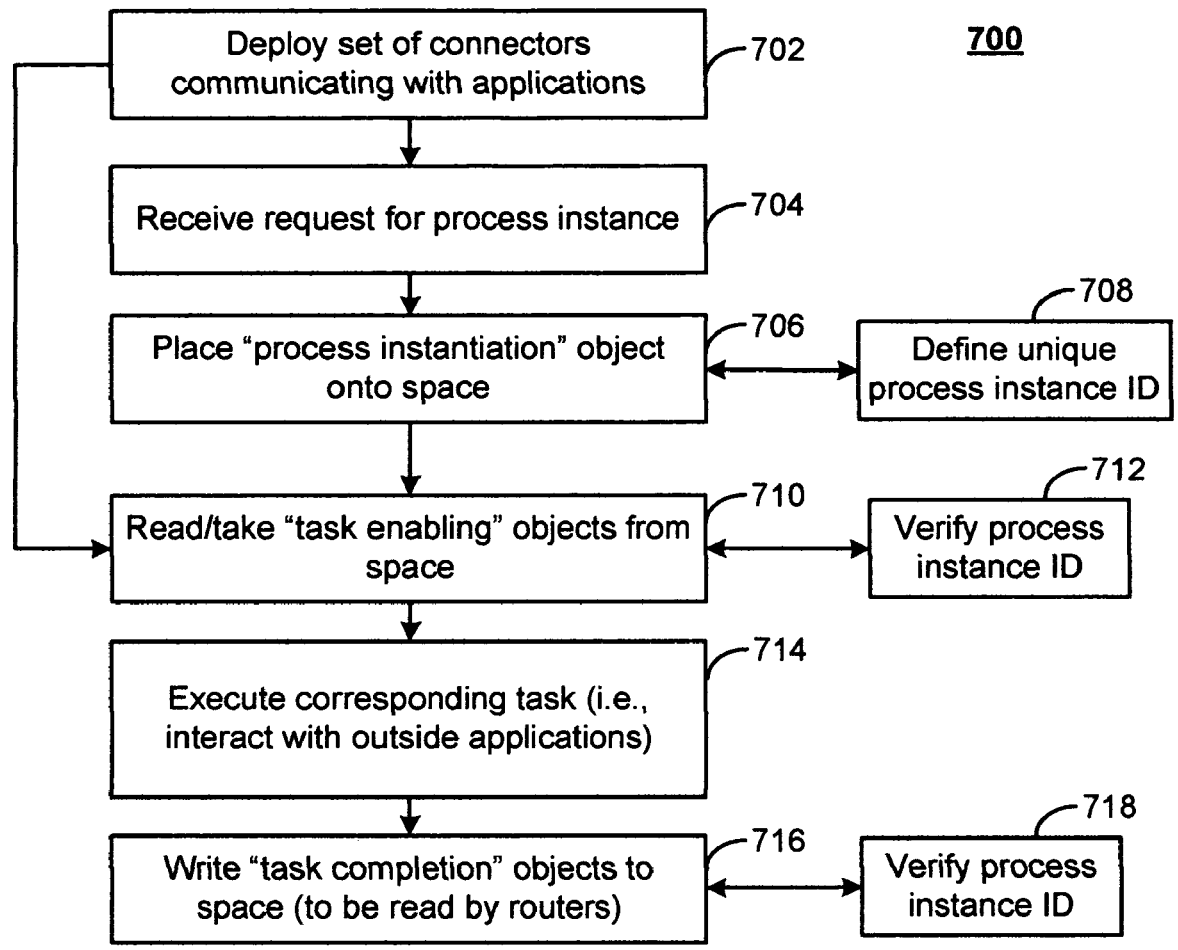
FIG. 7 is a flowchart illustrating operations of implementations of the system of FIG. 1.

FIG. 7 is a flowchart 700 illustrating further examples of operations of implementations of the system of FIG. 1. In particular, FIG. 7 illustrates example operations of the connectors 128. Although such operations may be performed in the context(s) of the various examples above, e.g., in the example of FIG. 5, FIG. 7 focuses primarily on operations of the connectors (e.g., 502, 510, and 512 in FIG. 5).

In FIG. 7, then, a set of connectors (e.g., the connectors 128) are deployed into the execution environment 116 to communicate with external applications 106, 108, and/or 110 (702). One of the connectors 128 may then receive a request for a process instance (704), e.g., from a user of a composite application. In response, the appropriate connector may then write a process instantiation object onto the memory space 124 (706), and, in conjunction, may define the unique process ID, piid, referenced above (708).

That connector, or another connector that may not be responsible for process instantiation, may then read/take task enabling objects from the memory space 124 (710), as may have been written to the memory space 124 in accordance with the description of the process 600 (e.g., 622). The piid may be verified at this point (712).

The reading connector may then execute its assigned task, i.e., by interacting with external applications, such as the applications 106, 108, and/or 110 (714). Once completed, the connector may then write a task completion object(s) to the memory space 124 (716), for reading/taking by a subscribing router (e.g., 618 in FIG. 6), where again the piid may be verified at this point (718).

By way of example overview of FIGS. 1 and 5-7, then, a set of routers 126 may be deployed and interconnected with existing applications 106, 108, and/or 110 (through the connectors 128) in order to coordinate the execution of the instances of a process model 104. During the execution of a process instance, the routers 126 read and take from the memory space 124, objects 130 denoting the completion of tasks (i.e. task completion objects) and write into the space objects denoting the enabling of tasks (i.e. task enabling objects). The connectors 128, on the other hand, read and take task enabling objects, execute the corresponding task by interacting with external applications, and eventually write back task completion objects, which are then read by one or more of the routers 126. As described, and in order to make sure that the routers 126 only correlate task completion events relating to the same instance of a process, object templates in the input set of the router will contain a constraint stating that all the matched task completion objects must have the same value for the attribute corresponding to the process instance identifier (piid). In addition, and as shown and described, when a router and/or connector writes a task enabling and/or task completion object to the memory space 124, the router/connector may include the corresponding piid. As shown, a process instance is created when a process instantiation object with the corresponding process and process instance identifier is placed on the memory space 124 by the appropriate connector, where the appropriate connector is responsible for ensuring that piid's are unique within the execution environment 116.

As described herein, the deployment of coordinators 126 and 128 operating on the shared memory space 124 and writing and taking objects to/from this space, constitutes a powerful paradigm not only for executing event-based coordination models, but also for re-configuring these models after their deployment. Re-configuration is facilitated by, for example, at least two features of the object-oriented coordination middleware: (i) the use of undirected (also known as "generative") communication primitives which allows data and events to be produced and consumed without a priori determined recipients (and thus allows data and control to be re-routed); and (ii) the ability to add, remove, suspend and resume individual coordinators and thus alter the behavior of an application.

In the context of FIG. 4 and similar examples, for example, some functionality may or should be made unavailable. In particular, a context change may mean that some processing can not be performed, or a user moving outside a firewall may prevent him/her from executing certain applications. In FIG. 4, it may happen that an executing system takes too much time to contact the other meeting participants to check if the meeting can be postponed (i.e., the execution of the "postpone meeting" task 426 may take more time than the user is willing to wait for).

In this case, a user may indicate that he or she does not wish to be delayed by this action, but instead, if the "check traffic conditions" task 424 is completed and if the traffic conditions are acceptable, then he or she would immediately take a taxi at task 434 (e.g., eliminating the possibility of taking the train at the task 416).

Such an adaptation may be achieved by activating a router 126x specified in an example concrete Extensible Mark-Up Language (XML) syntax in FIG. 8. In the XML fragment of FIG. 8, an input (e.g., task completion) object 802 includes an object template 804 having a piid 806 of the process instance for which this modification is to be done, the piid 806 being illustrated as having a value "1."

A condition 808 defines a variable associated with the checked traffic condition(s), so that a resulting output (i.e., task-enabling) object 810 enables the "catch taxi" task 434. A stopset element 812 indicates that the router 126x is disabled if the "Postpone Meeting" task 426 is completed. Thus, the router 126x will only place a task-enabling object to trigger the "catch taxi" task 434 if the check traffic task 424 completes before the postpone meeting task 426, and if the corresponding Boolean expression evaluates to true.

Such a router, written onto the object-oriented coordination middleware 116, may reduce or eliminate a need to modify the process model 104, thereby potentially avoiding a requirement of significant tool support and/or over-extensive model versioning. Thus, enabling an event-based rule (e.g., encoded as a router, as just described) may provide a lightweight adaptation mechanism.

As a further example, it may be the case that a user prefers taxis over trains in any case, and so would like always to catch taxis, regardless of traffic conditions and/or an amount of time before the meeting. In this case, a router may be introduced that enables the "catch taxi" task 434 immediately upon process instantiation, e.g., when the process instance is started by the user in question. At the same time, all other routers for that process instance would be disabled, except the ones for the "download notes" task 408 and the "display notes" task 442.

As referenced above, the user may specify such dynamic changes to composite applications (e.g., the application 112) using an appropriate user interface. For example, personalization applications may be added that run as coordinating objects and disable/enable routers, or place task-completion or task-enabling objects according to an adaptation logic previously coded by a developer.

Users also may be provided with options for adapting/personalizing applications. For example, when a user manually selects one of these options, a number of coordinators may be enabled, and/or task-completion and/or task-enabling objects may be written to or taken off the memory space 124. Adaptation may be scoped to specific process instances to avoid affecting a user base that is wider than intended. In addition, as described above with respect to FIG. 5, as certain adaptations become permanent, the adaptations may be propagated back to the process model, resulting in a new process model being deployed.

Figure 9:
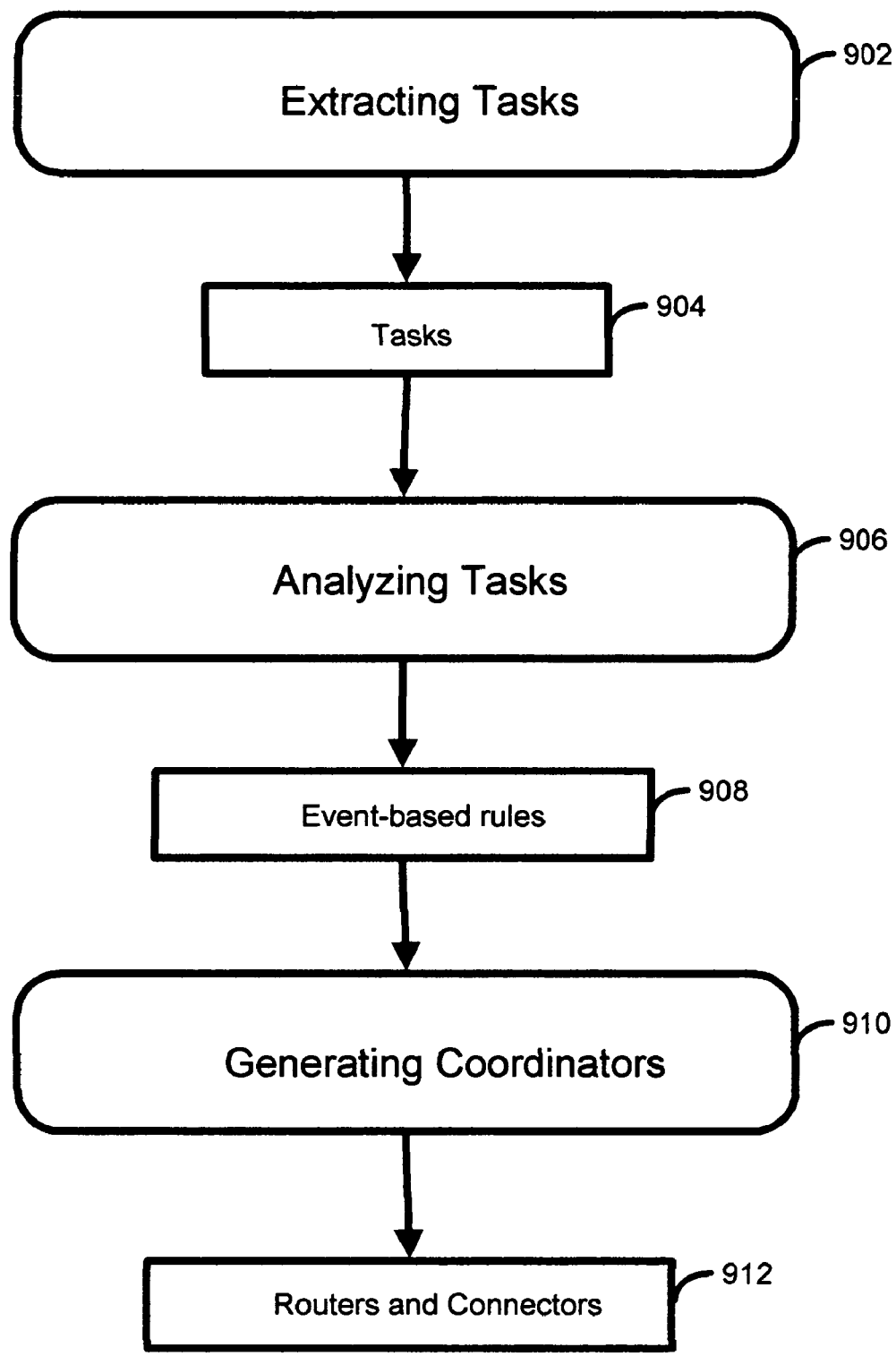
FIG. 9 is a first flowchart illustrating example operations of a process model transformer of the system of FIG. 1.

FIG. 9 is a first flowchart 900 illustrating example operations of the process model transformer 114 of the system of FIG. 1. In FIG. 9, a task extraction is performed (902). For example, the task extractor 118 may determine the tasks in the model 104 for extraction, or may determine the tasks within the activity diagram 400 of FIG. 4.

Resulting, extracted tasks (904) are then analyzed (906). For example, the task analyzer 120 may analyze the tasks and related information (e.g., transitions between the tasks, control nodes, and other information associated with a content or control of the tasks) to determine event-based rules (908). Such event-based rules may characterize, for example, activation and/or completion events for each of the tasks.

Then, coordinating objects are generated (910). For example, the object generator 122 may generate the routers 126 and connectors 128 (912) for deployment into the execution environment 116. As described, such coordinating objects will behave according to the event-based rules that are encapsulated therein during the object generation process(es). As a result, instances of the processes may proceed, for example, according to the descriptions provided above.

Although FIG. 9 is shown in the illustrated sequence, it should be understood that such a sequence is just one example of the possible operations of the model transformer 114 of FIG. 1. For example, different sequences may be used, and/or the operations of FIG. 9 may be performed recursively. Specific examples of such implementations and related implementations, are provided in more detail, below.

Figure 10:
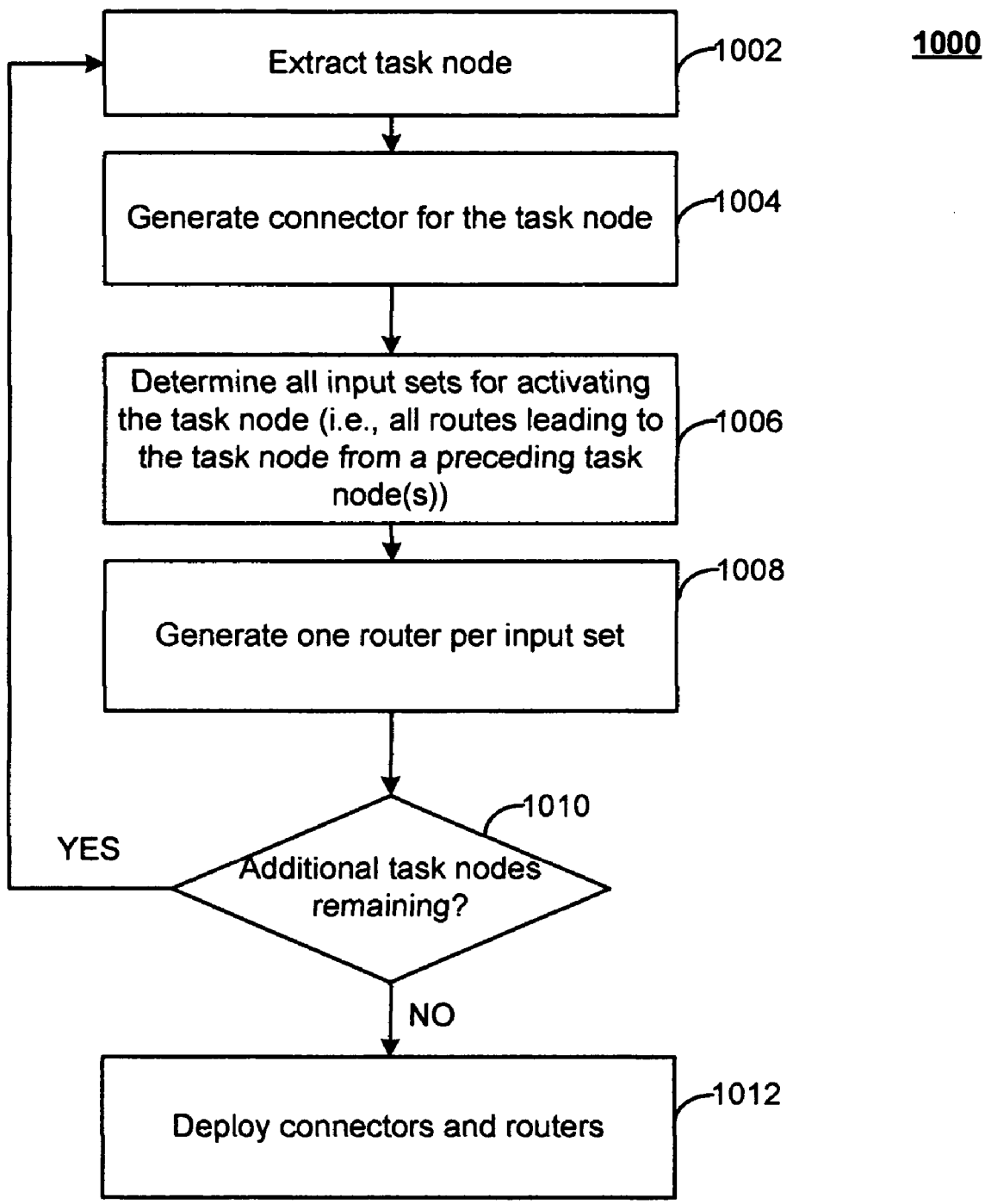
FIG. 10 is a second flowchart illustrating example operations of a process model transformer of the system of FIG. 1.

FIG. 10 is a second flowchart 1000 illustrating example operations of the process model transformer 114 of the system of FIG. 1. In particular, FIG. 10 provides examples of the operations of FIG. 9, in the more-specific contexts of the examples and terminology of FIGS. 5-8.

In FIG. 10, a first task node is extracted (1002), e.g., from the process model 104, and perhaps by the task extractor 118 of FIG. 1. The task node is analyzed, and a connector object is generated (1004).

Then, all input sets for activating the task node (i.e., for activating the connector object) are determined (1006). That is, as explained in the above discussion of input sets, object templates may be generated for each path leading to the task node, and Boolean conditions applied to, or associated with, these object templates, in order to differentiate and determine which of the potential paths was, in fact, followed in a particular process instance (e.g., see FIG. 6).

One router is then generated for each of the input sets (1008). Thus, a plurality of routers may exist for each connector, which is consistent with the idea that a plurality of paths may lead to each task node.

If additional tasks are remaining (1010), then the process 1000 continues as described above. Otherwise, the connectors and routers are ready for deployment (1012).

Figure 11:
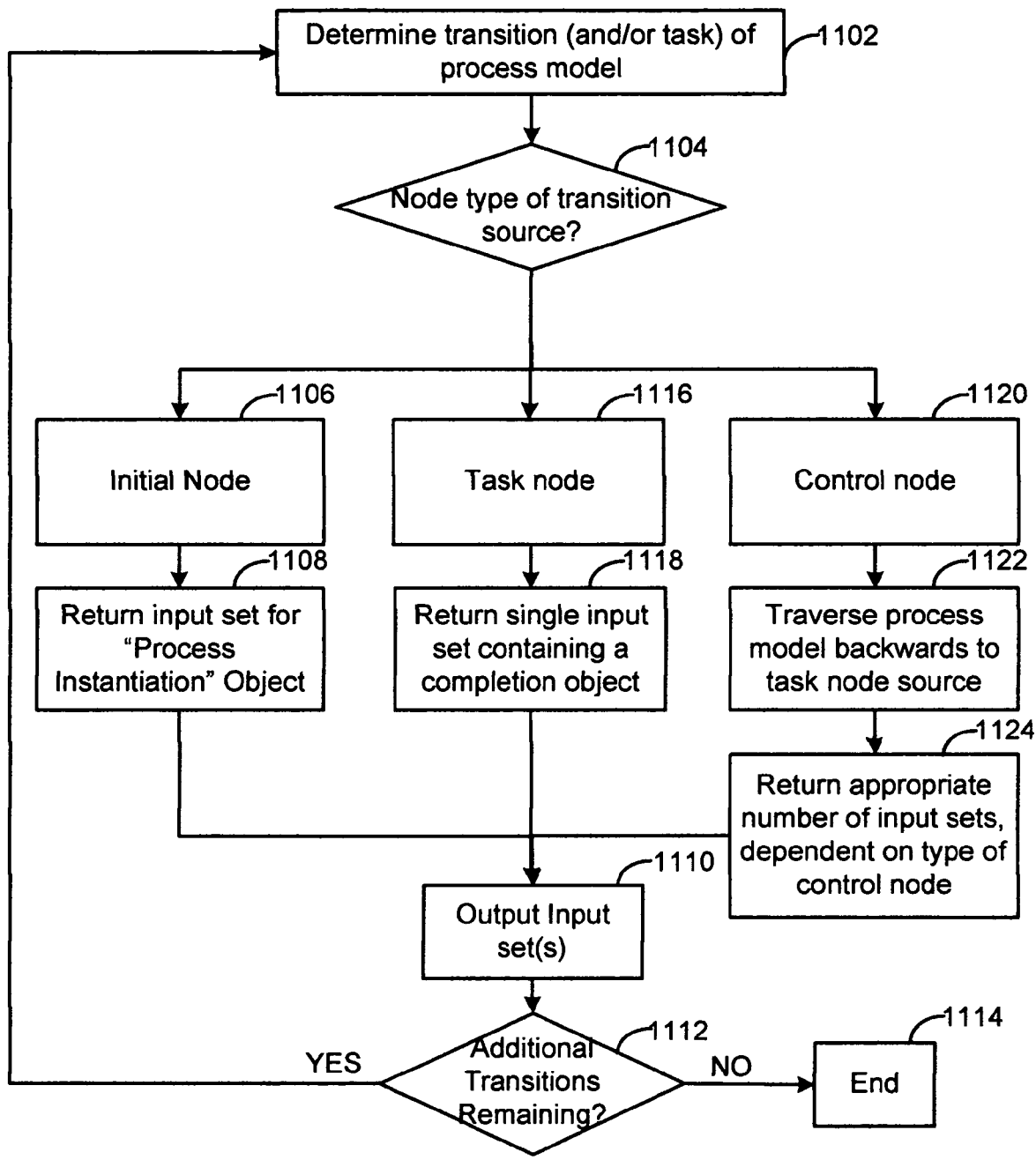
FIG. 11 is a third flowchart illustrating example operations of a process model transformer of the system of FIG. 1.

FIG. 11 is a third flowchart 1100 illustrating example operations of the process model transformer 114 of the system of FIG. 1. More specifically, FIG. 11 illustrates examples of techniques for generating input sets (e.g., 1006 in FIG. 10).

In FIG. 11, transitions and/or tasks are determined (1102), where transitions refer, as above, to the directional connectors (e.g., arrows) between any two tasks, control nodes, or other element(s) of the process model. Then, a node type of a source of a given transition is determined (1104). That is, since transitions directionally connect a first element to a second element, the first element may be considered to be a source of the transition, and the second element may be considered to be a target or destination of the transition. Specific examples are provided in more detail, below.

As one possibility, a source node may be determined to be an initial node (1106), i.e., a first node in the process model. In this case, then an input set for a "process instantiation" object is returned (1108), this input set may be output (1110) for deployment in association with a router.

If additional transitions are remaining in the process model (1112), then the process 1100 may continue with the next selected transition. Otherwise, the process 1100 may end (1114).

After the next transition is determined (1102), a node type of the transition's source may be determined (1104) to be a task node (1116). In this case, then a single input set would be returned containing a single task completion object (1118). That is, a task completion object associated with a completion of a task of the single task source would be sufficient as an input set for the router being defined.

For example, in FIG. 4, if a transition between the tasks 418 and 420 is selected (1102), then the node type of the source of the transition would be determined (1104) to be the task node 418 (1116). In this case, a task completion object for the "pay" task 418 would be sufficient to define an input set for the "catch train" task 420.

A third possibility for a source node type is a control node (1120), e.g., a non-task node that determines a flow or sequence of tasks, but is not itself a task that would be associated with a connector. Terminology for such control nodes varies with a selected process modeling language, and so representative examples are provided herein. For example, control nodes may include decision, merge, fork, and join nodes, as well as other control nodes mentioned herein.

In this case, then the process 1100 traverses backwards through the process model to a task source of the control node (1122). Then, an appropriate number of input sets are returned, dependent on a type of the control node in question (1124).

Specific examples are provided below, but generally, as seen in FIG. 4, the "go to train" task 416 has a control node 414 for a source. In this case, the process 1100 would traverse backwards from the control node 414, back to, for example, the tasks 404, 406, 424, and/or 426, i.e., the process 1100 would follow all backward paths until a task node on each path is found. In this way, all paths leading to each task node may be specified.

FIG. 12 is an example of a code section 1200 that may be used to implement the operations of the flowchart of FIG. 11, e.g., to generate input sets for the routers. The following notations are used in the code section 1200. Specifically, "ActionNodes(p)" refers to the set of action (i.e., task) nodes contained in process p (described as an activity diagram), while "Source(t)" represents the source state of transition t. "Guard(t)" represents the guard on transition t (where a guard generally represents a condition that specifies when a task or event can take place). "Disjuncts(c)" represents the set of disjuncts composing a condition c, while "IncomingTrans(x)" represents a set of transitions whose target is task node x.

"NodeType(x)" represents a type of node x (e.g. "action," "decision," or "merge"), and "Process(x)" represents the process to which node x belongs.

In the code section 1200, then, a first function 1202 ("AllInputSets") takes as input an activity diagram (e.g., the activity diagram 400) represented as a set of nodes (e.g., task, decision, merge, fork, join, initial, and final nodes) interlinked through transitions, and generates a set of input sets, where, as described, one or more input sets is then associated with a router so as to coordinate the execution of instances of the process in question, and where each input set encodes one possible way of arriving to a given task node in the process.

The function 1202 AllInputSets generates all the input sets for a given process model by relying on a second function 1204, illustrated as InputSets, which generates a set of input sets for a given task node of the process model. The function 1204 relies on a third (auxiliary) function 1206 illustrated as being named InputSetsTrans, which produces the same type of output as InputSets but takes as parameter a transition rather than a set. This definition of InputSetsTrans operates based on the node type of the source of the transition, as described above with respect to FIG. 11, where, as described, the source node may include a task node, an initial node, or one of the four (or more) types of control nodes. As shown in portion 1208, if the source of a transition is a task node, a single input set is returned containing a completion object for that task, as illustrated by way of example in FIG. 11 (1116 and 1118). As a result, the transition in question may occur when a completion object corresponding to the source task is placed onto the shared memory space (e.g., the memory space 124 of FIG. 1).

Similarly, if the source of the transition is the initial node 401 of the activity diagram, then, in a portion 1210, a single input set with a "process instantiation" object is created, indicating that the transition in question will be taken when an object is placed on the space that signals that a new instance of the process must be started. An example of this process also is shown in FIG. 11 (1106 and 1108).

If a source of the transition is a control node, a third portion 1212 of the code section 1200 works backwards through the activity diagram, traversing other control nodes, until reaching task nodes. In the case of a transition originating from a decision or a fork node, which is generally labeled by a guard (or an implicit "true" guard if no guard is explicitly given), the transition's guard is decomposed into its disjuncts, and an input set is created for each of these guards. This is done because, in this example, the elements of an input set are linked by an "and" (not an "or") and thus an input set can only capture a conjunction of elementary conditions and completion/instantiation objects (i.e. a disjunct). Finally, in the case of a transition originating from a "merge" (respectively a "join"), the portion 1212 is recursively called for each of the transitions leading to this merge node (join node), and the resulting sets of input sets are combined to capture the fact that when any (all) of these transitions is (are) taken, the corresponding merge node (join node) may activate.

In FIG. 12, the algorithm of code section 1200 focuses for purposes of illustration on a core subset of activity diagrams covering initial and final nodes, action nodes, and control nodes (e.g., decision, merge, fork, and join nodes) connected by transitions. The algorithm is merely intended for illustration, and various other aspects of a particular process model may be taken into account appropriately in a given context.

For example, the algorithm does not take into account object flow (which is discussed below with respect to FIG. 14). Also, the algorithm assumes that all conditional guards in the activity diagram are specified in disjunctive normal form, and that there are no "implicit" forks and joins in the diagram (where an implicit fork (join) occurs when several transitions leave from (arrive to) a task node). In such cases, for example, implicit forks and joins may be eliminated from an activity diagram and replaced by explicit fork and join nodes, prior to applying this algorithm.

FIG. 13 is an example of a code section 126y that may be a result of the operations of the flowcharts of FIGS. 9-12. Specifically, the code section illustrates a router 126y for the "CheckTraffic" task 424 of FIG. 4, using an XML syntax.

In FIG. 13, an input section 1302 includes an object template 1304 which checks for a completion object associated with the "check presentation time" task 404 for a given piid, as well as an object template 1306 which checks for a completion object associated with the "check train availability" task 406. A condition 1308 and a condition 1310 specify variables that must be evaluated appropriately (e.g., as true or false) in order for an output section 1312 that includes an enabling object for the "check traffic" task 424 to be enabled.

In other words, the code section (router) 126y illustrates that the task node 424 will only have the one router 126y associated to it, since there is only one transition (path) leading to the execution of the task 424. The router 126y illustrates that, to execute the task 424, it is necessary that both the "check presentation time" task 404 and the "check train availability" task 406 have completed, and in addition that the condition "not ontime and train" evaluates to true, and that this condition does not contain any disjunction. When all these conditions are satisfied, the router 126y will produce an enabling object in the output section 1312 that will eventually be picked up by the connector associated to action "check traffic."

In the example of FIG. 13, the process instance identifier (piid) attribute of the completion object templates are associated with a variable. In the concrete XML syntax, an XML namespace (aliased "var") is reserved to refer to variables. The object execution environment is capable of interpreting collections of object templates where some of the attributes are associated with such variables and to match these templates in a way that if the same variable is associated with attributes of two different templates, then the objects matching these templates should contain the same values for these attributes.

Figure 14:
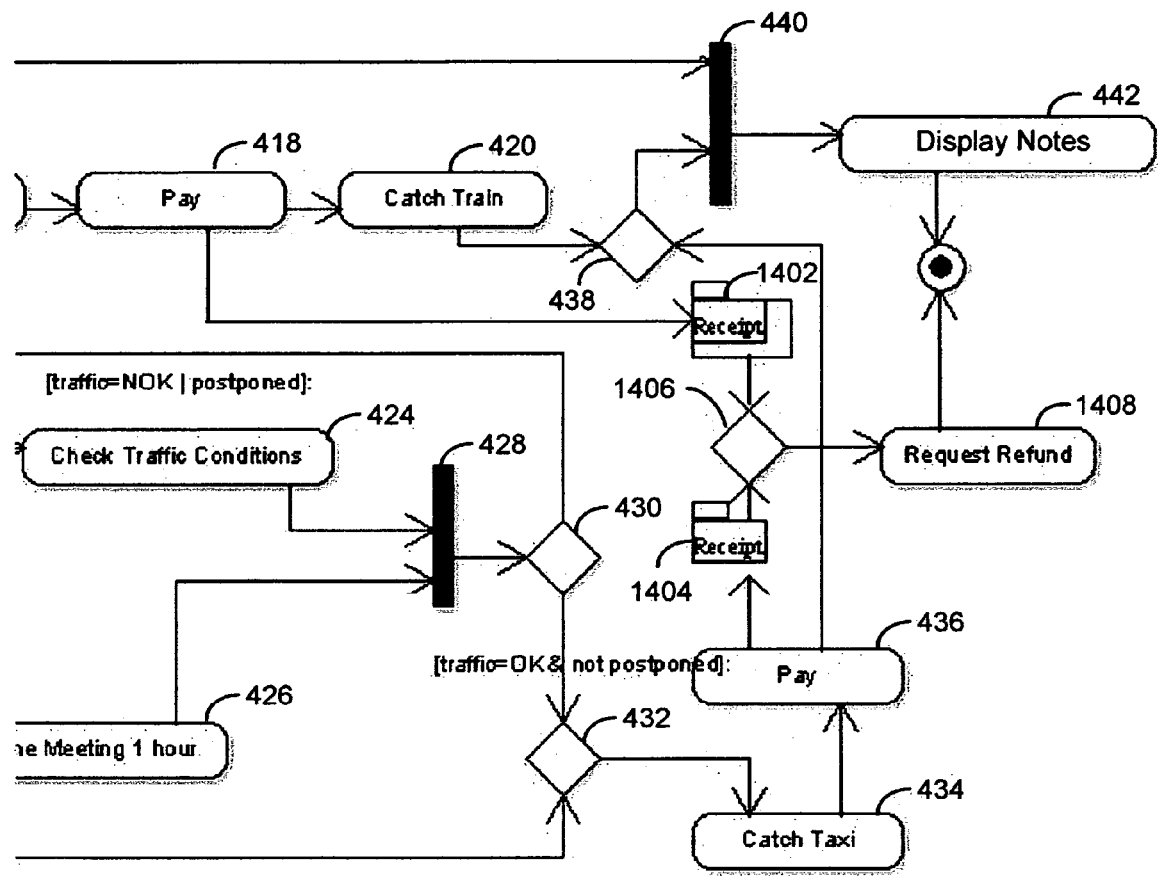
FIG. 14 is a block diagram of an implementation of a portion of the diagram 400 of FIG. 4.

FIG. 14 is a block diagram of an implementation of a portion of the diagram 400 of FIG. 4. In an activity diagram, data flow (i.e., object flow) is represented by object nodes, represented as example rectangles 1402 and 1404 associated with receiving a receipt for payment, as illustrated in FIG. 14. Such object nodes may be directly linked to a "producing" task or action preceding the object node. For example, the receipt objects 1402 and 1404 are linked to a producing "pay" task 418 and 436, respectively.

The object nodes 1402/1404 also may be linked, either directly or through the intermediary of a number of control nodes such as a control node 1406, to one or several "consuming" task node(s) following the object node(s), e.g., a "request refund" task 1408. In one example of FIGS. 4 and 14, the user pays using a mobile device, and this action produces a receipt object 1402/1404 that then is forwarded to a finance department so that the user may obtain a refund (i.e., may be reimbursed for the expense).

In terms of the techniques described herein, object flows are treated as follows. The production of objects for a given object node is the responsibility of the connector corresponding to the task node directly preceding this object node (i.e. the producing task). In other words, the corresponding object would appear as one of the elements in the "output" of the associated connector. In the example of FIG. 14, the production of objects 1402/1404 of type "Receipt" is done by the connectors of the task nodes 418/436 labelled "pay," as referenced above.

The consumption of objects corresponding to an object node is carried out by the connectors of task nodes that follow the particular object node, either directly or through the intermediary of a number of control nodes (i.e., the consuming actions). In the example of FIG. 14, the connector of the task node 1408 labeled "Request Refund" will take the object(s) 1402/1404 of type "Receipt" from the memory space 124 when the corresponding action is enabled.

Since object flow is handled exclusively by connectors, the algorithm of the code section 1200 of FIG. 12 generally does not have to deal with object nodes. Accordingly, object nodes may be removed from the activity diagram before applying the algorithm of code section 12 for deriving input sets. Such removal of object nodes from an activity diagram generally does not otherwise impact the analysis in a non-trivial way, since the object nodes have only one incoming and one outgoing transition.

As described above, a process model specified using, for example, UML activity diagrams can be translated into an event-based model that can be executed on top of a coordination middleware. For example, a process model may be encoded as a collection of coordinating objects that interact with each other through a shared object space. This approach is suitable for undertaking post-deployment adaptation of process-oriented composite applications. In particular, new control dependencies can be encoded by dropping new (or enabling existing) coordinating objects into the object-oriented coordination middleware and/or disabling existing ones.

Thus, by using an event-based coordination model at an execution layer, it is possible to make fine-grained changes to specific parts of the process model, and to confine these changes to specific process instances, without altering the process model. In other words, the process model can be used as a reference to deal with the majority of cases, but deviations can occur for specific cases based on the activation or de-activation of the rules composing the event model. In this way, the described techniques seamlessly combine techniques from event/coordination-based and from process-oriented software architectures, and provides for event-based, centralized orchestration based on coordination middleware.

Also, a mapping from event-based models to process models may be performed. For example, a process model may be automatically derived from a collection of routers and possibly connectors. Such reverse mapping may, for example, assist developers in propagating changes in the event-based model to the process model, when it is decided that these changes should be made permanent.

Although the above examples are discussed largely in terms of specific UML activity diagrams having certain features, elements, and constructs, it should be understood that the proposed algorithm(s) for input sets generation may be extended or modified to cover a larger set of process modeling constructs, such as signals in UML activity diagrams or advanced control-flow constructs.

Further, although the execution environment 116 is illustrated and discussed generally in the example of an object-oriented coordination middleware, it should be understood that any suitable execution environment may be used. For example, an Active Object Space (AOS) may be used as part or all of the execution environment 116, in which, for example, coordinators 126 and/or 128 are implemented as active objects that include their own threads of execution and that are deployed into the shared memory space 124. Other examples, modifications, and/or implementations of the execution environment 116 also may be used, as would be apparent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions of the invention by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method comprising:
   determining a selected task from among a plurality of tasks of a process model;
   associating a first event-based application with the selected task;
   determining at least one input set associated with activating the first event-based application, the input set associated with at least one event generated either when an instance of the process model is created and/or in response to completion of at least one preceding task of the selected task within the process model,
   defining a second event-based application as operable to receive the at least one event and evaluate the input set in order to determine whether to output a task-enabling event for enabling the first event-based application; and
   deploying the first event-based application and the second event-based application into a middleware in which the at least one event and the task-enabling event are written and/or read by the first event-based application and/or the second event-based application.

2. The method of claim 1 wherein defining a second event-based application as operable to receive the at least one event and evaluate the input set in order to determine whether to output a task-enabling event for enabling the first event-based application comprises:
   determining at least one object template associated with the completion of the at least one proceeding task and matching the input set; and
   defining conditions associated with the at least one object template for evaluation by the second event-based application as part of evaluating the input set.

3. The method of claim 1 wherein determining at least one input set for activating the first event-based application comprises:
   determining a transition of the process model, of which the selected task is a destination; and
   determining a node type associated with a source of the transition.

4. The method of claim 3 wherein determining a node type associated with a source of the transition comprises:
   determining that the source of the transition includes an initial node of the process model; and
   defining the input set to include a process instantiation event.

5. The method of claim 3 wherein determining a node type associated with a source of the transition comprises:
   determining that the source of the transition includes a task node of the process model; and
   defining the input set to include a completion event associated with a completion of the task node.

6. The method of claim 3 wherein determining a node type associated with a source of the transition comprises:
   determining that the source of the transition includes a control node of the process model; and
   traversing the process model backwards to reach at least one preceding task node.

7. The method of claim 6 comprising:
   defining the input set as one of an appropriate number of input sets that together represent possible paths through the process model from the at least one preceding task node to the selected task.

8. The method of claim 1 wherein associating a first event-based application with the selected task comprises:
   determining an external application with which the first event-based application communicates in order to perform the selected task.

9. The method of claim 1 comprising:
   generating an event-based representation of the process model, based on the input set and/or the at least one event.

10. A system including instructions recorded on a computer-readable medium, the system comprising:
    a task extractor that is operable to extract tasks from a process model;
    a task analyzer that is operable to analyze the tasks to determine event-based rules for enacting the process model within an event-based execution environment; and
    an object generator that is operable to generate objects for deployment into the execution environment that are operable to coordinate an event-based instance of the process model, based on the event-based rules.

11. The system of claim 10 wherein the task analyzer is operable to define, for each extracted task, the event-based rules to include at least one input set that specifies at least one path to each of the extracted tasks from a respective preceding task of the process model.

12. The system of claim 11 wherein the object generator is operable to generate the objects including:
    connector objects associated with the extracted tasks that are operable to coordinate with at least one external application for performance of the extracted tasks; and
    router objects encoded to read the input sets from a shared memory space and write task-enabling objects to the share memory space, based on the input sets.

13. The system of claim 10 wherein the task analyzer is operable to analyze at least one transition to a selected task of the extracted tasks and from a preceding task that is at least indirectly a source node of the selected task within the process model, and determine the event-based rules based on the transition and the source node.

14. The system of claim 13 wherein the source node includes one or more of an initial node of the process model, a task node of the process model, or a control node of the process model.

15. The system of claim 14 wherein the task analyzer is operable to determine the event-based rules at least in part by traversing the process model backwards from the selected task, through the control node, and one or more source nodes of the selected task.

16. An apparatus comprising a computer-implemented storage medium having instructions stored thereon, the instructions including:
    a first code segment for extracting tasks from a process model;
    a second code segment for analyzing the tasks to determine rules for activating the tasks according to the process model;

a third code segment for generating coordinating objects for coordinating execution of an instance of the process model according to event objects that are generated by the coordinating objects according to the rules; and a fourth code segment for deploying the coordinating objects into an execution environment to coordinate the execution of the instance of the process model therein, using the event objects.

17. The apparatus of claim 16 wherein the second code segment includes a fifth code segment for analyzing the rules to generate at least one input set that specifies at least one path to a selected one of the extracted tasks from a preceding task of the process model.

18. The apparatus of claim 16 wherein the second code segment includes a fifth code segment for analyzing a transition to a selected one of the extracted tasks to determine the rules, based on whether a source of the transition includes, at least indirectly, one or more of an initial node, a preceding task node, or a control node of the process model.

* * * * *